(12) United States Patent
Koyun et al.

(10) Patent No.: US 11,381,576 B2
(45) Date of Patent: Jul. 5, 2022

(54) MULTI-FACTOR AUTHENTICATION

(71) Applicants: Ismet Koyun, Worms (DE); Frank Wernert, Otterstadt (DE)

(72) Inventors: Ismet Koyun, Worms (DE); Frank Wernert, Otterstadt (DE)

(73) Assignee: KOBIL GmbH, Worms (DE)

( * ) Notice: Subject to any disclaimer, the term of this patent is extended or adjusted under 35 U.S.C. 154(b) by 194 days.

(21) Appl. No.: 16/788,017

(22) Filed: Feb. 11, 2020

(65) Prior Publication Data

US 2020/0177602 A1   Jun. 4, 2020

Related U.S. Application Data

(63) Continuation of application No. PCT/EP2017/070414, filed on Aug. 11, 2017.

(51) Int. Cl.
*H04L 9/40* (2022.01)

(52) U.S. Cl.
CPC ........ *H04L 63/105* (2013.01); *H04L 63/0876* (2013.01); *H04L 63/0884* (2013.01); *H04L 63/102* (2013.01); *H04L 63/108* (2013.01); *H04L 63/20* (2013.01)

(58) Field of Classification Search
CPC ............. H04L 63/105; H04L 63/0876; H04L 63/0884; H04L 63/102; H04L 63/108; H04L 63/20
USPC .......................................................... 726/7
See application file for complete search history.

(56) References Cited

U.S. PATENT DOCUMENTS

| | | | |
|---|---|---|---|
| 7,086,085 B1 | 8/2006 | Brown et al. | |
| 8,635,662 B2* | 1/2014 | Lang | G06F 21/31 726/1 |
| 8,893,293 B1* | 11/2014 | Schmoyer | H04L 63/08 726/26 |
| 10,003,604 B2* | 6/2018 | Fahmy | H04L 9/321 |
| 2014/0331282 A1* | 11/2014 | Tkachev | G06F 21/31 726/3 |
| 2015/0242605 A1 | 8/2015 | Du et al. | |
| 2016/0087957 A1 | 3/2016 | Shah et al. | |

OTHER PUBLICATIONS

Pavlovski et al., "Unified Framework for Multifactor Authentication", 2015 IEEE 22nd International Conference on Telecommunications, pp. 209-213 (Year: 2015).*
Brosso et al., 2010 IEEE, International Conference on Availability, Reliability and Security, "A Continuous Authentication System Based on User Behavior Analysis", pp. 380-385 (Year: 2010).*

* cited by examiner

*Primary Examiner* — Khalil Naghdali
(74) *Attorney, Agent, or Firm* — Reinhart Boerner Van Deuren P.C.

(57) ABSTRACT

A method is disclosed in which one or more pieces of first authentication information are obtained. The one or more pieces of first authentication information represent at least one piece of unique information associated with a user and/or an electronic device of the user. A trust level is determined based, at least in part, on the one or more pieces of first authentication information. The trust level value is indicative of a level of trust in the one or more pieces of first authentication information. An according apparatus, computer program, and system are also disclosed.

20 Claims, 5 Drawing Sheets

MULTI-FACTOR AUTHENTICATION

CROSS-REFERENCE TO RELATED PATENT APPLICATION

This patent application is a continuation of PCT/EP2017/070414, filed Aug. 11, 2017, the entire teachings and disclosure of which are incorporated herein by reference thereto.

FIELD

The following disclosure relates to the field of authentication, and in particular to authentication of a user requesting a service, or more particularly relates to systems, apparatuses, and methods for authentication of a user.

BACKGROUND

Nowadays, different approaches exist to authenticate a user that requests a service. As an example, the SAML (SAML: Security Assertion Markup Language) protocol authenticates a user that requests a service from a service provider. According to the SAML protocol, the possibility is offered to exchange security-associated information between two entities for providing authentication for the one entity seeking authentication.

According to the SAML protocol, the service may be requested e.g. by a terminal. Upon receiving the service request, a server of the service provider sends or triggers sending of an authentication request to an authentication server, which authenticates the user, e.g. by authentication credentials of the user like a PIN to be entered by the user. In case the authentication was successful, a response is returned by or triggered by the authentication server to the server of the service provider. Thus, the user is authenticated and the requested service can be provided to the user.

However, protection of the identity of the user checked by the authentication process is getting more and more important. For instance, authentication credentials, which may be used for identifying the user, may be copied by an unauthorized third person. The unauthorized third person may spoof the authentication server to believe that the unauthorized third person is the eligible user. In order to prevent fraudulent usage, additional protection of the identity is desirable.

SUMMARY

The drawback of prior art approaches for authenticating a user requesting a service is that since the user identity is checked based on static information of the user, the identity of the user is rather vulnerable and susceptible for fraudulent usage.

It is thus inter alia an object of the present invention to provide a solution in which authentication with improved security can be provided.

According to a first exemplary aspect of the present invention, a method is disclosed, the method comprising:
- obtaining one or more pieces of first authentication information, wherein the one or more pieces of first authentication information represent at least one piece of unique information associated with a user and/or an electronic device of the user; and
- determining a trust level based, at least in part, on the one or more pieces of first authentication information, wherein the trust level value is indicative of a level of trust in the one or more pieces of first authentication information.

This method may for instance be performed and/or controlled by an apparatus, which will be referred to as first apparatus in the following. This first apparatus may for instance be a server. Alternatively, this method may be performed and/or controlled by more than one apparatus e.g. a system comprising several apparatuses, for instance a server cloud comprising at least two servers. Alternatively, the first apparatus may for instance be an apparatus that is or comprises the electronic device of the user (e.g. a mobile terminal). For instance, the method may be performed and/or controlled by using at least one processor of the first apparatus.

According to a further exemplary aspect of the invention, a computer program is disclosed, the computer program when executed by a processor causing an apparatus, for instance a server or an electronic device, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed (and also referred to as first apparatus in the following), configured to perform and/or control or comprising respective means for performing and/or controlling the method according to the first exemplary aspect. The apparatus may for instance be a server, or an electronic device.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed (and also referred to as first apparatus in the following), comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud, or an electronic device. The disclosed apparatus according to any aspect of the invention may comprise only the disclosed components, for instance means, processor, memory, or may further comprise one or more additional components.

According to a further exemplary aspect of the invention, a system is disclosed, comprising:

an apparatus and at least one (or more than one) further apparatus, wherein the first apparatus is configured to, with the at least one (or more than one) further apparatus, to perform and/or control a method according to the first aspect of the present invention.

In the following, exemplary features and exemplary embodiments of all aspects of the present invention will be described in further detail.

The one or more pieces of first authentication information may for instance stem from the first apparatus (e.g. an electronic device like a terminal, smartphone, tablet, to name but a few non-limiting examples). They may for instance be gathered by the apparatus, e.g. by one or more sensors of the apparatus. Alternatively or additionally, the one or more pieces of first authentication information may for instance be received by the apparatus (e.g. a server) from another entity (e.g. an electronic device of the user).

The one or more pieces of first authentication information represent a unique information associated with a user and/or an electronic device of the user. For instance, the one or more pieces of first authentication information may (together) be indicative of a kind of fingerprint of how a user handles the electronic device.

Based, at least in part, on the one or more (obtained) pieces of first authentication information, the trust level is determined (e.g. according to a pre-defined algorithm or set of rules). The trust level is indicative of a level of trust in the one or more pieces of first authentication information. The trust level may for instance represent a value. For instance, the trust level may represent a value between a predefined range of values, wherein the lower limit of the range may be indicative of no trust at all in the one or more pieces of first authentication information. Additionally, the higher limit of the range may for instance be indicative of a maximum level of trust in the one or more pieces of first authentication information. A (determined) trust level may for instance be anywhere in between the predefined range. The trust level may for instance represent an abstract value from 0 to 100. For instance, in the aforementioned case, a trust level of 100 indicates perfect identification of a user and thus full trust. In contrast, a trust level of 0 indicates no trust at all. According to the determined trust level, e.g. an application performed and/or controlled by an electronic device, and/or a server may for instance decide whether tasks (e.g. transactions, in particular transactions of money) are carried out or not. Alternatively or additionally, according to the determined trust level, e.g. an application performed and/or controlled by an electronic device, and/or a server may for instance decide which amount of money is available for a transaction to be carried out. Examples of one or more trust level scenarios may be one or more of the following: (i) trust level 0 to 30: no transactions allowed; (ii) trust level 31 to 60: Only non-financial transactions are allowed (e.g. get bank account statement or the like); (iii) trust level 61 to 90: Non-financial transactions and financial transactions up to a predefined amount of money (e.g. 1000 Euro or Dollars) are allowed; (iv) trust level 91-100: unlimited transactions are allowed; (v) or a combination thereof.

An application performed by the electronic device of the user may for instance obtain (e.g. measure and/or determine) the one more pieces of first authentication information. The obtained one or more pieces of first authentication information may for instance be provided to a server and thus obtained (e.g. received) by the server. The server may for instance determine the trust level based, at least in part, on the one or more pieces of first authentication information. Alternatively, the application performed by the electronic device may for instance obtain the one or more pieces of first authentication information and determine the trust level. The determined trust level may for instance be provided to a server. The server may for instance check the provided trust level. The method according to the first aspect of the present invention may for instance be part of an application performed by the electronic device. Alternatively, the method according to the first aspect of the present invention may for instance be a purpose-built application to be performed by the electronic device. Alternatively, the method according to the first aspect of the present invention may for instance be part of a software development kit (SDK) e.g. to be used with an electronic device.

The trust level may for instance be determined by evaluating the one or more pieces of first authentication information. One respective trust level may for instance be determined for each of the one or more pieces of first authentication information. In case more than one trust level is determined, a summarized trust level may for instance be determined, e.g. an arithmetic average or mean average is calculated based, at least in part, on the more than one trust levels. The summarized trust level may for instance be determined e.g. by a weighting of the more than one pieces of trust levels. For instance, a determined trust level may not be either "true" or "false". A determined trust level may for instance be a value between a predefined range, e.g. between 0 and 100. In this way, the one or more pieces of first authentication information may for instance be evaluated by determining the trust level. The trust level may for instance be determined based, at least in part, on a comparison of the (obtained) one or more pieces of first authentication information with comparable one or more pieces of information. For instance, one or more pieces of information may be provided during an initial process for obtaining one or more pieces of reference information. The initial process may for instance represent a learning process for obtaining one or more pieces of reference information, which may be used for determining the trust level. Additionally or alternatively, the one or more pieces of reference information may for instance be the one or more pieces of first authentication information, which were provided at an earlier time.

The first apparatus may for instance be an electronic device, in particular the electronic device of the user.

The electronic device of the user may for instance be portable (e.g. weigh less than 5, 4, 3, 2, or 1 kg). The electronic device may for instance be at least temporarily (e.g. in removable form) or permanently installed in a vehicle. The electronic device may for instance comprise or be connectable to a display for displaying interaction, e.g. for interaction with a user. The electronic device may for instance comprise or be connectable to means for outputting sound, e.g. in the form of spoken commands or information. The electronic device may for instance comprise one or more sensors. The one or more sensors may for instance be for determining the devices position, such as for instance a Global Navigation Satellite System (GNSS) receiver, e.g. in the form of a Global Positioning System (GPS) receiver. Alternatively or additionally, the one or more sensors may for instance be for determining of gestures, swiping, typing, touching, holding, turning, carrying, or a combination thereof to name but a few non-limiting examples. For instance, corresponding one or more sensors may be accelerometers, gyroscopes, touch sensors, time sensors, or a combination thereof to name but a few non-limiting examples. Alternatively or additionally, the one or more sensors may for instance be camera sensors for gathering image information. For instance, based on (gathered) information of an image sensor, still or video information may be obtained. The electronic device may for instance be suitable for or configured to performing and/or controlling an application, e.g. for providing authentication process of a user.

The determined trust level may for instance be outputted, e.g. to a server, or—in case the trust level is determined by a server—to an electronic device (e.g. the electronic device of the user) or to another apparatus that transfers the determined trust level to the electronic device. The trust level may for instance be used in an authentication process, e.g. an application performed and/or controlled by an application, e.g. performed and/or controlled by an electronic device (e.g. the electronic device of the user).

It should be noted that the step of obtaining the one or more pieces of first authentication information and the step of determining the trust level can take place at least partially in parallel in case at least one of the one or more of more pieces of first authentication information is obtained before obtaining the other pieces of first authentication information. Thus, a trust level may for instance be determined for the at least one of the one or more pieces of first authentication information and further one or more pieces of first authentication information may be obtained in parallel. Alternatively, the step of obtaining the one or more pieces of first authentication information and the step of determining the trust level can take place sequentially.

Example embodiments of the present invention thus make it possible to determine a trust level representing a level of trust in information (the one or more pieces of first authentication information) used e.g. in an authentication process. Thus, this additional information (the determined trust level) enhances the security of authentication of the user and reduces the potential for fraudulent authentication.

According to an exemplary embodiment of all aspects of the present invention, the trust level can adopt more than two values. For instance, the trust level may represent a value, or a status. The value may for instance be a value from a predefined range of values comprising at least three different values, e.g. 0, 1, 2, or from 0 to 100, to name but a few non-limiting examples. The status may for instance be a status indicative of at least three different statuses, e.g. −1, 0, 1 to name but one non limiting example. Alternatively, the trust level may for instance adopt two values, e.g. a binary value (e.g. 0 and 1, or −1 and 1, to name but a few non-limiting examples).

According to an exemplary embodiment of all aspects of the present invention, the method further comprises: checking the trust level, wherein the trust level is checked based, at least in part, on a comparison of the (determined) trust level with an (e.g. predefined) checking threshold.

The trust level may for instance be checked for determining an authentication information. The authentication information may for instance be indicative of, at least in part, whether the one or more pieces of first authentication information based on which, at least partly, the trust level is determined are integer or not. Additionally or alternatively, the authentication information may for instance be indicative of, at least in part, whether an authentication of the user based on the one or more pieces of first authentication information is considered successful or not. Additionally or alternatively, the authentication information may for instance comprise the determined trust level.

In case an authentication information is determined based, at least in part, on the checked trust level, the authentication information may for instance be indicative of, at least in part, a positive authentication in case the trust level is above (or equal to) the (e.g. predefined) checking threshold, and/or the authentication information may for instance be indicative of, at least in part, a negative authentication in case the trust level is below (or equal to) the checking threshold.

The checking threshold may for instance be predetermined, or may be determined according to a predefined rule. The checking threshold may be set to be dependent on a type of service (e.g. a transaction) the user shall be authenticated to. Services, which require a higher level of security, may for instance be transactions of money, or transactions of money considering the amount of money to be transferred. In comparison, services, which require a lower level of security may for instance be checking the account balance, or logging in into a banking account to name but a few non-limiting examples.

In an exemplary embodiment of all aspects of the present invention, the trust level is a time dependent function, wherein the trust level decreases with elapsing of time. In this embodiment, after a trust level has been determined, the value of the determined trust level decreases with elapsing of time. The decreasing of the trust level with elapsing of time may for instance represent that the integrity of the obtained one or more pieces of first authentication information is timely restricted. In this way, it is ensured that the one or more pieces of first authentication information used for determining the trust level are up to date and fraudulent usage is hardened, since e.g. in case a fraudulent user tries to copy one or more pieces of first authentication information, chances are high that these copied one or more pieces of first authentication information are outdated, since the copied one or more pieces of first authentication information have already been used to determine the trust level, and the trust level was already decreased with elapsing of time. Therefore, the trust level may not be increased (again) by these copied one or more pieces of first authentication information.

In an exemplary embodiment of all aspects of the present invention, the time dependent function defines the decreasing of the trust level. For instance, the time dependent function may for instance be a linear function. In this case, the trust level decreases with elapsing of time linearly. Alternatively, the time dependent function may for instance be an exponential function. In this case, the trust level also decreases with elapsing of time. At first, the trust level decreases slowly with elapsing of time. As time elapses further, the decreasing of the trust level becomes faster. Alternatively, the time dependent function may for instance be a combination of a linear and an exponential function. For instance, at first the trust level may decrease linearly. After a predefined amount of time has elapsed, the decreasing of the trust level follows an exponential function. After another predefined amount of time has elapsed, the decreasing may for instance follow a linear function again. In this way, different time dependent functions may for instance be implemented according to requirements of a given use case.

According to an exemplary embodiment of all aspects of the present invention, the steps of obtaining one or more pieces of first authentication information and of determining a trust level are repeated (e.g. one or several times) to obtain an updated trust level in case the trust level has fallen below a predefined authentication threshold.

The authentication threshold may for instance represent a threshold, at which the user fulfills a requirement of being associated with at least a minimum amount of trust to be authenticated, so that the one or more pieces of first authentication information, e.g. provided by the user, can be considered to be integer. This may for instance be in case the determined trust level is equal to or above the authentication threshold. In case the determined trust level is below the authentication threshold, or has fallen below the authentication threshold, the user does not fulfill a requirement of being associated with at least a minimum amount of trust associated with the one or more pieces of first authentication information, e.g. provided by the user. In this last mentioned case, it is not possible to authenticate the user successfully at all. In order to authenticate the user successfully (again), the trust level needs to be (re-)established. Thus, in this embodiment, one or more pieces of first authentication information need to be obtained, a trust level needs to be determined, and the trust level can be checked against the authentication threshold (again).

The updated trust level is obtained to increase the trust level, in particular to increase the trust level to be set at least equal to the authentication threshold. Additionally, the updated trust level is obtained to increase the trust level to be set at least equal to the checking threshold, in case the service the user shall be authenticated to requires the trust level to be equal than or be above the checking threshold.

The authentication threshold may for instance be different from the checking threshold. The authentication threshold may for instance be indicative of the trust level the determined trust level must fulfill for an authentication of the user. The authentication threshold may for instance be considered to be a fixed limit. In contrast, the checking threshold may for instance be variable limit. As mentioned above in this specification, the checking threshold may for instance depend on the service (e.g. a transaction or the like) a user requests to be authenticated to. In some cases, the authentication threshold and the checking threshold may for instance be set to the same value. Due to e.g. a checking of the trust level against the authentication threshold, in case the trust level is above the authentication threshold, a minimum trust level can be ensured. For instance, as long as the trust level has not fallen below the authentication threshold, the checking—in the context of a transaction request—of the trust level against a (e.g. transaction-specific) checking threshold may be performed without obtaining "new" one or more pieces of first authentication information for authenticating the user for this transaction. Thus, obtained one or more pieces of first authentication information may for instance be used for a plurality (e.g. several) of transaction requests of a user as long as the determined trust level has not fallen below the authentication threshold. Equally well, the authentication threshold may be a function (e.g. of a minimum or maximum) of one or more (e.g. all) respective checking thresholds associated with a plurality of services (e.g. transaction types) the user can request and requires authentication for. If the function is the minimum function, it is ensured that at least the transaction with the lowest associated checking threshold can always be performed without the user having to provide one or more pieces of first authentication information specifically for this transaction. If the function is the maximum function, it is ensured that all transactions can be performed without the user having to provide one or more pieces of first authentication information specifically for any of the transactions.

According to an exemplary embodiment of all aspects of the present invention, the one or more pieces of first authentication information comprise one or more of the following types i) to v) of parameters:

i) one or more behavior recognition parameters;
ii) one or more acoustical recognition parameters;
iii) one or more optical recognition parameters, in particular one or more face recognition parameters;
iv) one or more temporal constraints parameters;
v) one or more local constraints parameters.

Each of the one or more parameters of the one or more pieces of first authentication information may for instance be obtained by one or more sensors (e.g. of the electronic device of the user). In this specification, it may for instance be referred to the types of parameters also as "smart authentication parameters".

The one or more behavior recognition parameters may for instance be indicative of a unique way a user handles his electronic device. The one or more behavior recognition parameters may for instance be obtained by gathering information, e.g. by one or more sensors, of the electronic device of the user. For instance, the one or more sensors may for instance comprise at least one accelerometer, gyroscope, touch sensor, time sensor, or a combination thereof to name but a few non-limiting examples. One or more pieces of information gathered by these one or more sensors may for instance form a unique behavioral fingerprint. The one or more behavior recognition parameters may for instance represent such a behavioral fingerprint. The one or more behavior recognition parameters may for instance be automatically obtained by use of the electronic device. Thus, no explicit action of the user may for instance be required.

The one or more acoustical recognition parameters may for instance be indicative of a voice of the user to be authenticated. For instance, the one or more acoustical recognition parameter may for instance be obtained by an acoustic sensor, e.g. a microphone or the like of an electronic device. The one or more acoustical recognition parameter may for instance comprise a sound recording of the user, e.g. obtained by the acoustic sensor. Further, the one or more acoustical recognition parameters may for instance be analyzed to recognize the user for determining the trust level. Additionally, a protection against fake in user recognition may for instance be achieved by a robot-based optical detection process (e.g. a voice detection process).

The one or more optical recognition parameters may for instance be indicative of a photo or video of at least a part of the user to be authenticated. For instance, the one or more optical recognition parameter may for instance be obtained by a camera sensor, e.g. of an electronic device. The one or more optical recognition parameter may for instance comprise a photo or a video of at least a part of the user, e.g. obtained by the camera sensor. Further, the one or more optical recognition parameters may for instance be analyzed to recognize the user for determining the trust level. Additionally, a protection against fake in user recognition may for instance be achieved by a robot-based optical detection process (e.g. a face detection process). For instance, a face detection robot may give a user random instructions, e.g. tell the user to close his left or right eye or to turn his head to the left or to the right. If the given instruction(s) are carried out properly, the face in the gathered photo or video is genuine. If the given instruction(s) are not carried out properly, and a fraudulent photo or video of the user (e.g. obtained (e.g. taken) prior by the user intending fraud) is at present. Based, at least in part, on the result of the optical detection process, the trust level may be determined.

The one or more temporal constraints parameters may for instance be indicative of a certain time and/or date at which the user wants to be authenticated. The one or more temporal constraints parameters may for instance be analyzed for determining the trust level. For instance, one or more temporal constraints may be predefined. The one or more temporal constraints may for instance be stored in a database. The one or more temporal constraints parameters of the one or more pieces of first authentication information may for instance be verified against the predefined one or more temporal constraints. The predefined one or more temporal constraints may for instance be indicative of a certain time and/or date (or a time interval) the user can be authenticated. Examples of one or more temporal constraints may for instance be one or more of the following: (i) transactions may only be valid during work hours (e.g. from 9 to 5); (ii) transactions may only be valid if the user is not on holiday; (iii) transactions may only be valid with a defined start and end date; (iv) or a combination thereof.

The one or more local constraints parameters may for instance be indicative of a certain (e.g. horizontal) position, at which an electronic device (and thus the user of the electronic device to be authenticated) is (e.g. currently, i.e. at a time at which the one or more pieces of first authentication information are measured and/or obtained) positioned. The one or more local constraints parameter may for instance be position detection feature e.g. provided by an electronic device. Alternatively or additionally, the one or more local constraints parameters may for instance be indicative of a certain network or network component the electronic device of the user is currently connected to, (e.g. a WiFi access point or cellular radio system cell), a certain time zone in which the electronic device of the user is currently located and/or positioned, a certain service provider the user of the electronic device of the user currently uses, or a combination thereof to name but a few non-limiting examples. In order to protect the one or more local constraints parameters against manipulation (e.g. by fraudulent third parties or users), more than one position detection features and/or location history may for instance be used. For instance, the one or more local constraints parameters may be combined and an algorithm may calculate a risk of manipulation, which may for instance be used to determine the trust level. The one or more local constraints may for instance be stored in a database. The one or more local constraints parameters of the one or more pieces of first authentication information may be verified against predefined one or more local constraints. Examples of one or more local constraints may for instance be one or more of the following: (i) transactions may only be valid within a certain area, and/or within a certain country, or outside a particular country; (ii) transactions may only be valid at the user's home address; (iii) or a combination thereof to name but a few non-limiting examples.

The one or more pieces of first authentication information (e.g. comprising i) one or more behavior recognition parameters; ii) one or more face recognition parameters; iii) one or more temporal constraints parameters; iv) one or more local constraints parameters; or a combination thereof) may for instance be stored, e.g. in a database. Stored one or more pieces of first authentication information may for instance be used for determining a trust level, e.g. by verifying one or more smart authentication parameters comprised by one or more pieces of first authentication information against the historic stored ones (e.g. stored at a prior time). Stored one or more pieces of first authentication information may for instance be part of one or more pieces of historic information, which may for instance additionally be used for determining the trust level. One or more pieces of first authentication information stored in the database may for instance be updated (e.g. constantly updated) by obtained one or more smart authentication parameters, e.g. comprised by obtained one or more pieces of first authentication information.

In case one of the one or more pieces of first authentication information comprises more than one smart authentication parameter, a respective trust level may for instance be determined for each of the parameters comprised by the one or more pieces of first authentication information.

Further, the trust level may for instance be determined based on a random, or pseudo-random or time-varying combination of the parameters of the one or more pieces of first authentication information. In this way, the security of an authentication may be enhanced since a user intending fraudulent usage does not know which parameter is used for determining the trust level.

According to an exemplary embodiment of all aspects of the present invention, the trust level is determined based, at least in part, on at least two different types of types i) to v) parameters comprised by the one or more pieces of first authentication information. For instance, the one or more pieces of first authentication information comprise at least two different parameters in case they comprise e.g. one behavior recognition parameter and e.g. one temporal constraints parameter. In contrast within the meaning of the present invention, the one or more pieces of first authentication information do not comprise at least two different parameters in case they comprise e.g. two temporal constraints parameters.

In an exemplary embodiment of all aspects of the present invention, the one or more behavior recognition parameters are obtained over a period of time, which is predefined or determined according to a predefined rule. The period of time may for instance be of a predefined duration, or the duration of the period of time may for instance be (e.g. adaptively) determined according to a predefined rule. The duration of the period of time may for instance be of one or more minutes, hours, days, or weeks to name but a few non-limiting examples.

According to an exemplary embodiment of all aspects of the present invention, the one or more behavior recognition parameters are obtained more than once. For instance, the one or more behavior recognition parameters may for instance be obtained at least twice or a plurality of times. The one or more behavior recognition parameters may for instance be obtained more than once over the period of time. The one or more behavior recognition parameters may for instance be obtained steadily, or discrete, e.g. after elapsing of predefined time intervals. By obtaining the one or more behavior recognition parameters more than once, the plurality of one or more behavior recognition parameters as instances may for instance form a behavioral fingerprint. The behavioral fingerprint may for instance represent at least a part of the at least one piece of unique information associated with the user and/or the electronic device of the user.

In an exemplary embodiment of all aspects of the present invention, the one or more behavior recognition parameters are obtained based, at least in part on (e.g. a combination with) one or more behavior recognition parameters obtained at a previous time. For instance, the combination may represent a change from the previously obtained one or more behavior recognition parameters to the one or more behavior recognition parameters. The combination may for instance represent the history of obtained one or more behavior recognition parameters. By combining the one or more behavior recognition parameters with previously obtained one or more behavior recognition parameters, the combination may for instance form a behavioral fingerprint. The behavioral fingerprint may for instance represent at least a part of the at least one piece of unique information associated with the user and/or the electronic device of the user.

Additionally or alternatively, one or more of the other types of parameters different from the one or more behavior recognition parameters may for instance be obtained as well over the period of time. Additionally or alternatively, one or more of the other types of parameters may for instance be obtained as well more than once. Additionally or alternatively, one or more of the other types of parameters may for instance be obtained as well based, at least in part, on a combination with one or more of the same type of parameters obtained at a previous time.

In an exemplary embodiment of all aspects of the present invention, the method further comprises:
  obtaining one or more pieces of second authentication information, wherein the one or more pieces of second authentication information comprise one or more of the following types a) and b) of parameters:
    a) one or more trust refreshing parameters, wherein the one or more trust refreshing parameters are indicative of a trust level value;
    bi) one or more trust reference parameters, wherein the one or more trust reference parameters are indicative of a trust level value associated with an (e.g. external) trust authority,
wherein the trust level is determined further based, at least in part, on the one or more pieces of second authentication information.

The one or more pieces of second authentication information may for instance stem from an apparatus (e.g. an electronic device like a terminal, smartphone, tablet, to name but a few non-limiting examples), which may for instance be the first apparatus of the present invention (e.g. the electronic device of the user) or may be another apparatus. They may for instance be gathered by the apparatus, e.g. by one or more sensors thereof. Alternatively or additionally, the one or more pieces of second authentication information may for instance be received by the first apparatus, or by another entity. The one or more pieces of second authentication information may for instance be obtained automatically, e.g. in predefined time intervals. Alternatively or additionally, the one or more pieces of second authentication information may for instance be obtained on demand, e.g. in response to a request for obtaining such pieces of information. A request for obtaining such pieces of information may for instance stem from an application of an electronic device. For instance, the application of the electronic device may for instance provide one or more services for a user of the electronic device. For instance, the one or more services provided by the application may be (e.g. successfully or not successfully) performed and/or controlled, based on the (e.g. successfully or not successfully) performed and/or controlled one or more services, one or more pieces of second authentication information comprising one or more trust refreshing parameters corresponding to the (e.g. successfully or not successfully) performed and/or controlled one or more services provided by the application of the electronic device.

By determining the trust level based, at least in part, on the one or more second authentication information, the security of the identity of the user may be improved even further due to the additional consideration of the one or more pieces of second authentication information when determining the trust level. For determining the trust level based, at least in part, on the one or more pieces of first authentication information and the one or more pieces of second authentication information, an initial trust level may for instance be determined based on the one or more pieces of first authentication information. Then, the determined trust level may for instance be varied corresponding to the one or more pieces of second authentication information. In this way, the trust level can be determined based, at least in part, on the one or more pieces of first authentication information and on the one or more pieces of second authentication information.

According to an exemplary embodiment of all aspects of the present invention, the trust level is determined further based, at least in part, on the (obtained) one or more pieces of second authentication information.

The one or more trust refreshing parameters may for instance represent a value between a predefined range of values (e.g. between 0 and 100). In case the trust level is determined based, at least in part, on the one or more pieces of second authentication information, the value may be added to the trust level. The trust level may for instance be increased by the one or more trust refreshing parameters, e.g. by the value represented by the one or more pieces of second authentication information. The value represented by the one or more trust refreshing parameters may for instance depend on the type of parameter used for obtaining the one or more trust refreshing parameters. For instance, in case the one or more trust refreshing parameters are based, at least in part, on information provided by a biometric sensor (e.g. of the electronic device of the user), the value to be added to the trust level may be relatively large compared to a case where the one or more trust refreshing parameters are based, at least in part, on e.g. a PIN of the user. The PIN of the user can be faked more easily than e.g. a biometric fingerprint of the user. Thus, one or more pieces of second authentication information comprising one or more trust refreshing parameters of a biometric sensor may for instance lead to a larger increase of the trust level than one or more pieces of second authentication information comprising one or more trust refreshing parameters of a PIN of the user. Alternatively or additionally, a decreased trust level may for instance be refreshed, e.g. by determining a new value of the trust level according to pre-defined rules, e.g. by an algorithm. For instance, a trust refreshing parameter may for instance be associated with one or more certain events. For instance, a trust refreshing parameter may for instance be associated with a checking of a behavior of the user. Based on the behavior of the user, a new value of the trust level may for instance be determined according to pre-defined rules, e.g. an algorithm. The new value of the trust level may for instance be increased or decreased based on the result of the checking of the behavior of the user. For instance, the trust level value may be decreased in case the behavior of the user is in contrast to typically observed behavior of the user. The trust level value may for instance be increased in case the behavior of the user matches the typically observed behavior of the user. The determined value of the trust level, which may for instance be a result of the algorithm, may for instance be a value in the range of the values 0 to 100. The determined value of the trust level may for instance not be outside of the range of the values 0 to 100.

The one or more trust refreshing parameters may for instance be determined based, at least in part, on the one or more pieces of first authentication information. For instance, the one or more trust refreshing parameters may for instance increase or decrease the trust level, e.g. a trust refresh is established by increasing the trust level. In contrast, the trust level may be decreased by a trust refresh, e.g. in case the user is blocked or the user is considered to be not integer so that the rights of the users are limited. The blocking of the user and/or the limitation of rights of the user may for instance be determined by a server, e.g. a server of the certain service provider the user of the electronic device of the user currently uses. Refreshing the trust level may for instance be done by determining the one or more trust refreshing parameters based, at least in part, on the one or more pieces of first authentication information in two ways.

The first way may for instance be as follows:

(i) constantly scanning the user, e.g. obtaining one or more behavior recognition parameters, one or more acoustical recognition parameters, one or more optical recognition parameters (e.g. one or more face recognition parameters), one or more local constraints parameters, one or more time constraints parameters, or a combination thereof. These obtained one or more parameters may for instance be compared with corresponding one or more parameters stored in a database. In case the obtained one or more parameters match (e.g. in a pre-defined manner) or equal the stored ones, the one or more trust refreshing parameters may for instance be considered to add a certain value to the trust level.

The second way for refreshing the trust level may for instance be as follows:

(ii) The trust level may for instance be refreshed on demand, e.g. by a request of the user. For instance, the determined trust level may fall below a threshold (e.g. in case the trust level is a time dependent function, as described previously in this specification) and due to this, a request for a trust refresh is generated. The generating of a request may for instance be performed automatically in case the trust level falls below a (e.g. pre-defined, or determined according to a set of rules) threshold.

The one or more pieces of second authentication information may for instance comprise one or more trust reference parameters. For instance, dependent upon the (e.g. external) trust authority, the one or more trust reference parameters may for instance increase the trust level. The one or more trust reference parameters may for instance represent a value between a predefined range of values (e.g. between 0 and 100). In case the trust level is determined based, at least in part, on the one or more pieces of second authentication information, the value may be added to the trust level. The trust level may for instance be increased by the one or more trust reference parameters. Referencing (e.g. external) trust authorities may for instance be done dynamically, periodically or on demand. Examples of one or more trust reference parameters may for instance be one or more of the following: (i) one or more letter activations (e.g. a user answers one or more physical activation letters sent via standard mail, answers are stored); (ii) third party identity providers (e.g. via SAML protocol) (e.g. only non-critical information may be passed to the third party providers); (iii) any other data source in a back-end (e.g. of a back-end application for enhancing the trust level); (iv) or a combination thereof.

The trust level may for instance be increased by a combination of the one or more trust refreshing parameters and of the one or more trust reference parameters.

According to an exemplary embodiment of all aspects of the present invention, the method further comprises:

determining at least one calibration information based, at least in part, on the one or more pieces of first authentication information and/or based, at least in part, on the one or more pieces of second authentication information, wherein the calibration information used to define a threshold.

The threshold may for instance be the authentication threshold or the checking threshold. Alternatively, the calibration information may for instance be used to define the authentication threshold and the checking threshold.

Alternatively, the method may further comprise:

determining one or more pieces of calibration information based, at least in part, on one or more pieces of first authentication information obtained previously, wherein the one or more pieces of calibration information are indicative of at least one calculated calibration level indicative of a trust in at least one piece of unique information associated with the user and/or with the electronic device of the user.

The at least one calibration information may for instance be obtained previously, e.g. in an initial stage, e.g. prior to performing and/or controlling the method according to all aspects of the present invention.

The at least one calibration information may for instance comprise a unique behavior fingerprint determined based, at least in part, on one or more behavior recognition parameters. During an initial stage, the unique behavior fingerprint is determined so that obtained one or more first authentication information comprising one or more behavior recognition parameters may for instance be verified against the unique behavior fingerprint.

Alternatively or additionally, the at least one calibration information may for instance comprise information of a face (or other part) of the user. During an initial stage, these information may for instance be obtained so that obtained one or more first authentication information comprising one or more face (or other part) recognition parameters may for instance be verified against the information of a face of the user.

Alternatively or additionally, the at least one calibration information may for instance comprise one or more temporal constraints and/or one or more local constraints (e.g. obtained during an initial stage). Obtained one or more first authentication information comprising one or more temporal constraints parameters and/or one or more local constraints parameters may for instance be verified against the one or more temporal constraints and/or the one or more local constraints. The one or more temporal constraints and/or the one or more local constraints may for instance be entered by a user according to his preferences, or be obtained automatically.

The trust level threshold may for instance represent one or more trust level scenarios, as described above.

The at least one calculated calibration level of at least one smart authentication parameter may for instance be adaptable. For instance, the at least one calculated calibration level of at least one smart authentication parameter may be calculated at different time points, or continuously in pre-defined time intervals, or based upon certain events (e.g. "new" one or more pieces of first and/or second authentication information are obtained), to name but a few non-limiting examples.

The calculation of the at least one calibration level of at least one smart authentication parameter may for instance be based, at least in part, on one or more smart authentication parameters obtained at an earlier stage. Thus, the calculation of the at least one level of at least one smart authentication parameter may be based on historic information.

In an exemplary embodiment of all aspects of the present invention, the authentication threshold and/or the checking threshold is set based, at least in part, on the at least one calibration information.

According to an exemplary embodiment of all aspects of the present invention, the one or more pieces of first authentication information and/or the one or more pieces of second authentication information are stored in a database. The database may for instance be connected to the first apparatus according to the first aspect of the present invention, (e.g. a server). The database may for instance be connected to the server e.g. via the internet and allowing access from the apparatus to stored information of the database. Alternatively, the database may be embodied in the apparatus, e.g. the server.

In an exemplary embodiment of all aspects of the present invention, the one or more pieces of first authentication information and/or the one or more pieces of second authentication information stored in the database are adaptable. For instance, the one or more pieces of first authentication information and/or the one or more pieces of second authentication information may for instance be adapted continuously, in predefined time intervals, in real-time, or a combination thereof, to name but a few non-limiting examples. Alternatively, one or more instances of the one or more pieces of first authentication information and/or the one or more pieces of second authentication information are stored in the database for acquiring historic information. For acquiring these one or more instances, each time a new instance of one or more pieces of first authentication information and/or of one or more pieces of second authentication information are obtained (e.g. by the server), this new instance is additionally stored in the database.

According to an exemplary embodiment of all aspects of the present invention, the at least one calibration information is determined based, at least in part, on the one or more pieces of first authentication information and/or the one or more pieces of second authentication information stored in the database.

Further, since the trust level is a time dependent function, a refreshing of the trust level may for instance be performed and/or controlled in case the value of the trust level falls below the predefined threshold. The predefined threshold may for instance be the authentication threshold or the checking threshold. Further, an additional pre-defined threshold being indicative of a trust level being higher than the value of the trust level of the predefined threshold may for instance be determined. The additional predefined threshold may for instance be used to output e.g. an alarm and/or warning, which may be provided to the user, e.g. warning the user that the trust level may fall below the predefined threshold. In case the value of the trust level falls below the predefined threshold, a request for refreshing the trust level may for instance be generated. Based on the generated request, e.g. one or more pieces of second authentication information may for instance be obtained, e.g. for performing a refresh of the trust level. In case the trust level is still below the predefined threshold after a refresh of the trust level was performed, the user may for instance be blocked and/or the usage of an application of the electronic device and/or the usage of a service provided to the user may for instance be blocked.

In an exemplary embodiment of all aspects of the present invention, the method further comprises:

obtaining one or more pieces of third authentication information, wherein the one or more pieces of third authentication information are indicative, at least in part, of one or more of the following:

(i) one or more ownership parameters;
(ii) one or more knowledge parameters;
(iii) one or more biometric parameters;
(iv) or a combination thereof.

In contrast to the one or more pieces of first authentication information, the one or more pieces of third authentication information are provided by the user solely. In contrast, the one or more pieces of first authentication information comprise some kind of determining process for generating e.g. a behavioral fingerprint, an acoustical recognition parameter, an optical recognition parameter, time and/or date constraints, to name but a few non-limiting examples performed based on unique information associated with the user and/or the electronic device of the user. The unique information associated with the user and/or the electronic device of the user may for instance be gathered by one or more sensors of the electronic device.

The one or more pieces of third authentication information may for instance be obtained by gathering the one or more pieces of third authentication information by one or more sensors of the electronic device. The one or more pieces of third authentication information are indicative, at least in part, of one or more of the following: (i) one or more ownership parameters; (ii) one or more knowledge parameters; (iii) one or more biometric parameters; (iv) or a combination thereof.

The one or more ownership parameters may for instance represent indication of an ownership of an electronic device (e.g. the electronic device of the user) by the user. For instance, the one or more ownership parameters may represent an identifier of the electronic device, which was used e.g. during an activation process of an application performed and/or controlled by the electronic device. Based on this, the application may for instance be bound (e.g. exclusively) to the electronic device used during the activation process. Additionally, another identifier of the application may for instance be represented by the one or more ownership parameters. Thus, the identifier for the electronic device and the other identifier of the application may for instance be checked to enhance the likelihood that authentication of the user is not fraudulent.

The one or more knowledge parameters may for instance represent a unique knowledge, which may only be known on part of the user. For instance, the one or more knowledge parameters may represent a PIN, e.g. a PIN for unlocking an electronic device, and/or another PIN for unlocking an application of the electronic device. The application may for instance be an application of the electronic device used during an activation process, and/or requesting authentication of the user.

The one or more biometric parameters may for instance be indicative of a unique (e.g. physical) attribute of the user. The one or more biometric parameters may for instance be obtained (e.g. gathered) by one or more sensors of an electronic device. For instance, the one or more biometric parameters may for instance represent a fingerprint of the user. The fingerprint of the user may for instance be obtained by a fingerprint sensor of an electronic device (e.g. the electronic device of the user).

In an exemplary embodiment of all aspects of the present invention, the trust level is further determined based, at least in part, on the one or more pieces of third authentication information. In this way, the security is further enhanced.

According to an exemplary embodiment of all aspects of the present invention, the method further comprises:

providing the determined trust level for usage in an authentication process.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
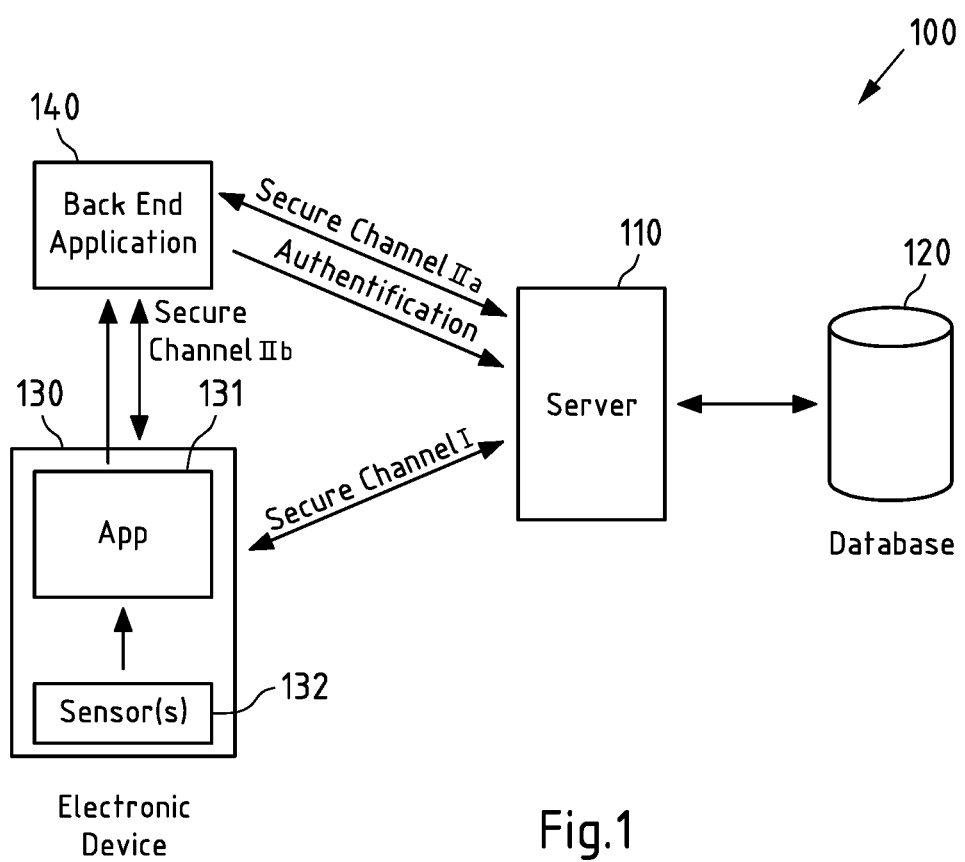
FIG. 1 shows a schematic block and interaction diagram of a system according to an exemplary embodiment of the present invention.

FIG. 1 shows a schematic block and interaction diagram of a system 100 according to an exemplary embodiment of the present invention.

System 100 comprises a server 110, which may alternatively be embodied as a server cloud (e.g. a plurality of servers connected e.g. via the internet and providing services at least partially jointly), a database 120, which may be connected to the server e.g. via the internet and allowing access from the server 110 to data of the database 120. Alternatively, the database 120 may be embodied e.g. in the server 110. Further, the system 100 comprises an electronic device 130, e.g. a smartphone, a tablet, or a portable computer to name but a few non-limiting examples, and a backend application 140, which may be configured to be used and/or controlled by another application 131 performed by the electronic device 130. Alternatively, the backend application 140 may be performed by the electronic device 130 as well. The backend application 140 may for instance be installed on the electronic device 130, or on the server 110, or on another apparatus.

According to an example embodiment, the electronic device 130 may provide one or more pieces of first authentication information (e.g. obtained from one or more sensors 132 or user interface elements of the electronic device 130). Additionally, the electronic device 130 may provide one or more pieces of second authentication information (e.g. trust reference parameters obtained from an external trust authority) and/or one or more pieces of third authentication information (e.g. a PIN entered by the user into the electronic device 130). Additionally, the database 120 may store the provided one or more pieces of first, second and/or third authentication information, e.g. provided by the electronic device 130, and/or provided by the server 110, and/or provided by the back-end application 140, based on received one or more pieces of first, second and/or third authentication information. In a further exemplary embodiment, the server 110 may provide an authentication information to the electronic device 130. In an exemplary embodiment, the electronic device 130 may for instance request a service from a server of a service provider. The server of the service provider may for instance be the server 110, but may also be another server (not shown in FIG. 1). To authenticate the user of the electronic device requesting the service, the server of the service provider may for instance request authentication of the user of the electronic device 130 from the server 110. Communication, e.g. for the transmission of the information, e.g. between the electronic device 130 and the server 110, may for instance take place at least partially in a wireless function, e.g. based on cellular radio communication or on Wireless Local Area Network (WLAN) based communication, to name but a few non-limiting examples, or entirely wire-bound.

The one or more pieces of first, second and/or third authentication information may be provided by the electronic device 130 to the server 110, e.g. via the backend application 140. The provision of the one or more pieces of first authentication information to the server 110 may for instance be triggered by the server of the service provider, wherein the user of the electronic device 130 has requested the provision of a service. The server 110 may then for instance determine a trust level based on the one or more pieces of first authentication information or based on the one or more pieces of first authentication information and on the one or more pieces of second authentication information. Additionally, the server 110 may for instance check the determined trust level based, at least in part, on a comparison with a predefined checking threshold. Based on the result of the comparison, server 110 may for instance generate an authentication information indicative of whether the user is successfully authenticated or not. The electronic device 130 may be configured to receive the authentication information provided by the server 110. The received authentication information may then be provided to the server of the service provider. The provision of the authentication from the electronic device 130 to the server of the service provider may for instance indicate to the server of the service provider that the user was successfully authenticated or not. Alternatively, the authentication information may be provided to the server of the service provider, e.g. directly or via a redirected operation involving the electronic device 130.

The one or more pieces of first, second and/or third authentication information, the authentication information, and/or further communication transmitted between the app 131 of the electronic device 130 and the server 110 may for instance use a secure communication channel being established between the app 131 of the electronic device 130 and the server 110. In FIG. 1, two exemplary realizations of such a secure channel are shown: secure channel I established directly between app 131 of the electronic device 130 and the server 110; and secure channel II established indirectly between the app 131 of the electronic device 130 and the server 110. Secure channel II is divided into two parts: secure channel II.a and secure channel II.b. Secure channel II.a and secure channel II.b indicate that the secure channel II is established indirectly between the app 131 of the electronic device 130 and the server 110, wherein the first part secure channel II.a of the secure channel II may for instance be established between the server 110 and the backend application 140, and the second part secure channel II.b of the secure channel II may for instance be established between the back-end application 140 and the app 131 of the electronic device 130. The establishing of the secure communication channel (e.g. secure channel I or secure channel II) may for instance take place prior to the provision of the one or more pieces of first, second and/or third authentication information by the electronic device 130 to the server 110. The establishing of the secure communication channel (e.g. secure channel I or secure channel II) may for instance be performed based on a request for a service from a server of a service provider originating from the electronic device 130, in particular the app 131 of the electronic device 130, which may for instance be executed by a user to be provided with the service of the service provider.

In this way, e.g. an authentication based on multiple smart or smart and dynamic parameters (e.g. as factors) comprised by the one or more pieces of first authentication information or comprised by the one or more pieces of first authentication information and the one or more pieces of second authentication information and/or the one or more pieces of third authentication information may be provided as a service to electronic device(s) of user(s).

Figure 2A:
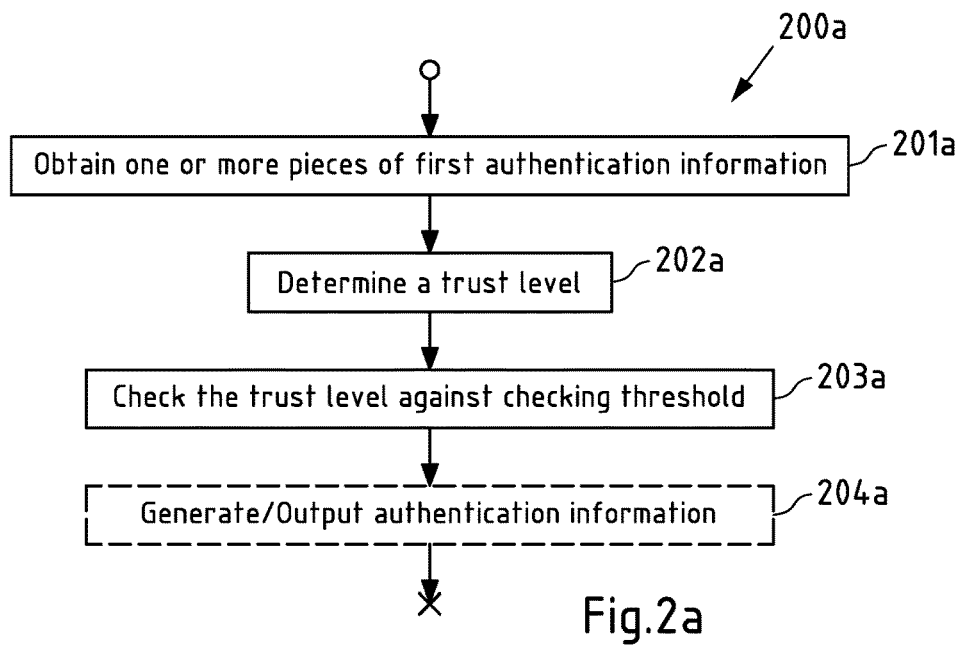
FIG. 2a shows a flowchart showing an example embodiment of a further method according to the first exemplary aspect of the present invention, for instance performed by electronic device 130 of FIG. 1.

FIG. 2a shows a flowchart 200a showing an example embodiment of a method according to the first exemplary aspect of the present invention. This flowchart 200a may for instance be performed by server 110 of FIG. 1, and/or by the electronic device 130 and/or by the backend application 140.

In step 201a, one or more pieces of first authentication information are obtained. The one or more pieces of first authentication information represent at least one piece of unique information associated with a user and/or an electronic device (e.g. electronic device 130 of FIG. 1) of the user. For instance, the one or more pieces of first authentication information may comprise one or more of the following types i) to v) of parameters: i) one or more behavior recognition parameters; ii) one or more acoustical recognition parameters; iii) one or more optical recognition parameters; iv) one or more temporal constraints parameters; v) one or more local constraints parameters. The one or more pieces of first authentication information may for instance be received, e.g. from an electronic device (e.g. electronic device 130 of FIG. 1). Alternatively, the one or more pieces of first authentication information may for instance be gathered, e.g. by one or more sensors 132. The one or more sensors 132 may for instance be comprised by the electronic device. The one or more pieces of first authentication information may for instance represent information gathered by the one or more sensors 132, e.g. of the electronic device (e.g. electronic device 130 of FIG. 1). The one or more sensors may for instance be sensors connectable to the electronic device (e.g. electronic device 130 of FIG. 1). Based on these pieces of information, e.g. a behavior recognition parameter indicative of user-specific behavior may for instance be determined.

In step 202a, a trust level is determined, e.g. by a server (e.g. server 110 of FIG. 1). The trust level is determined based, at least in part, on the one or more pieces of first authentication information. The trust level is indicative of a level of trust in the one or more pieces of first authentication information. For instance, the trust level may represent a value (e.g. between a predetermined range, wherein the range specifies a lower range limit with no level of trust in the one or more pieces of first authentication information associated with at all, and a higher range limit with maximum level of trust in one or more pieces of first authentication information associated with).

In an optional step 203a, the trust level is checked. For instance, the determined trust level of step 202a is compared to a predetermined threshold (e.g. a checking threshold). To name but a non-limiting example: Based on the result of the comparison (e.g. the trust level is lower, higher or equal than the predetermined threshold), a task (e.g. a service requested by a user requiring an authentication) may for instance only allowed to be carried out in case the determined trust level is above or equal than the predetermined threshold. In case the determined trust level is lower than the predetermined threshold, the task may for instance not allowed to be carried out. Further specification may for instance be possible: One or more further ranges within the predetermined range may for instance be defined. One of the one or more further ranges may for instance be indicative of an amount of money, which is allowed to be transferred, in case the task requested by the user as a service is e.g. a bank transfer. For instance, in case the determined trust level is higher than the predetermined threshold, and within the range briefly adjacent to the predetermined threshold, the amount of money the user is allowed to transfer may for instance be limited. Additionally, in case the determined trust level is higher than the predetermined threshold, and within the range orientated towards the higher end of the range specifying a lower range limit with no level of trust and a higher end with maximum level of trust, the amount of money the user is allowed to transfer may be not limited, or limited to the maximum amount possible.

In optional step 204a, an authentication information comprising e.g. the determined trust level, is generated. Additionally, the generated authentication information may be outputted, e.g. to a server of a service provider, for usage in an authentication process.

In this way, the security of an authentication of the user can be enhanced by using one or more pieces of first authentication information. Further, the security of the authentication of the user may for instance be further enhanced by using one or more pieces of second authentication information or one or more pieces of second authentication information and one or more pieces of third authentication information additionally.

Figure 2B:
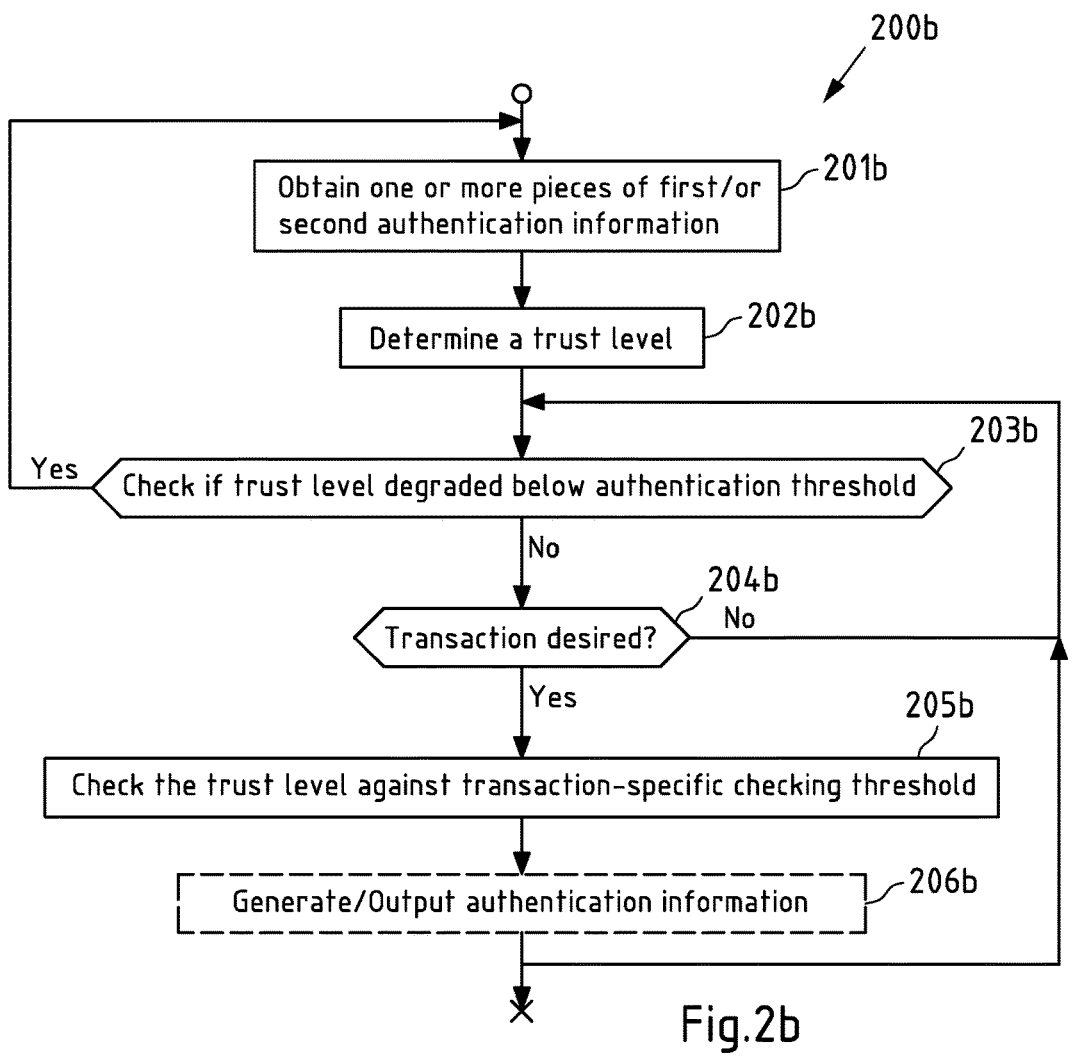
FIG. 2b shows a flowchart showing an example embodiment of a method according to the first exemplary aspect of the present invention, for instance performed by electronic device 130 of FIG. 1.

FIG. 2b shows a flowchart 200a showing an example embodiment of a further method according to the first exemplary aspect of the present invention. This flowchart 200b may for instance be performed by server 110 of FIG. 1, and/or by the electronic device 130 and/or by the backend application 140.

As in FIG. 2a, in step 201b one or more pieces of first authentication information are obtained. Additionally, one or more pieces of second authentication information may for instance be obtained. The one or more pieces of second authentication information may for instance comprise one or more of the following types a) and b) of parameters: a) one or more trust refreshing parameters; b) one or more trust reference parameters.

In step 202b a trust level is determined, based at least in part, on the obtained one or more pieces of first authentication information, or based, at least in part, on the obtained one or more pieces of first authentication information and on the obtained one or more pieces of second authentication information. For determining the trust level based, at least in part, on the one or more pieces of first authentication information and the one or more pieces of second authentication information, an initial trust level may for instance be determined based on the one or more pieces of first authentication information. Then, the determined trust level may for instance be varied corresponding to the one or more pieces of second authentication information. In this way, the trust level can be determined based, at least in part, on the one or more pieces of first authentication information and on the one or more pieces of second authentication information.

In this embodiment of the present invention, the determined trust level is a time-dependent function, wherein the trust level decreases with elapsing of time.

In step 203b, it is checked whether the determined trust level has degraded—due to the decreasing of the trust level with elapsing of time—below an authentication threshold. The authentication threshold may for instance represent a threshold, at which the user fulfills a requirement of being associated with at least a minimum amount of trust to be authenticated.

In case the trust level is above the authentication threshold, a minimum trust level can be ensured. For instance, as long as the trust level has not been fallen below the authentication threshold, the checking of the trust level against a (e.g. transaction-specific) checking threshold may be performed without obtaining "new" or additional one or more pieces of first authentication information. Thus, obtained one or more pieces of first authentication information may for instance be used for a plurality (e.g. several) of transaction requests of a user as long as the determined trust level has not been fallen below the authentication threshold. In step 204b, it is checked whether the user desires to perform a transaction, e.g. a transaction request of the user is received, e.g. by the server of the service provider. A transaction request of the user may for instance comprise a request for checking of an account balance, or of transferring money to another person, to name but a few non-limiting examples.

In case the trust level has fallen below the authentication threshold, transaction requests of the user cannot be fulfilled, e.g. performed by a service provider offering a service to the user. Thus, it may be proceeded with step 201b.

In step 205b, the trust level is checked against a transaction-specific checking threshold. The checking threshold may for instance be higher for transactions requested by the user of higher security requirements. For instance, a simple request of the user for checking an account balance may have a lower checking threshold than a request for transferring money to another user. In case the trust level is equal to or above the transaction-specific checking threshold, the transaction requested by the user is performed. In case the trust level is not above the transaction-specific checking threshold, the request of the user for performing the transaction is denied.

In optional step 206b, an authentication information may be generated based, at least in part, on the result of the checking of step 205b. The generated authentication information may for instance be indicative of whether the transaction requested by the user is allowed to be performed or not. Further, the generated authentication information may be outputted, e.g. for usage in an authentication process of the user, e.g. an authentication process of a service of a service provider for performing a transaction requested by the user.

Figure 3:
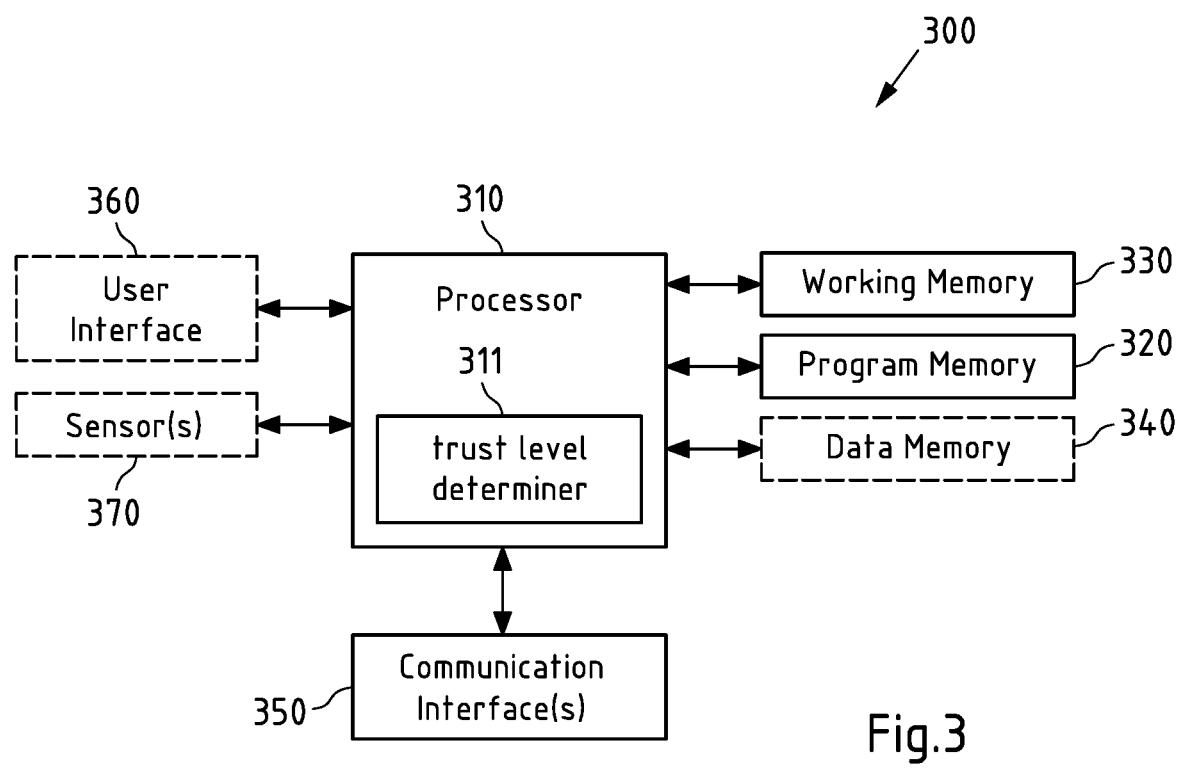
FIG. 3 shows a schematic block diagram of an apparatus according to an exemplary embodiment of the present invention.

FIG. 3 is a schematic block diagram of an apparatus 300 according to an exemplary aspect of the present invention, which may for instance represent the electronic device 130, 140, and/or 150 of FIG. 1. Alternatively, the schematic block diagram of the apparatus 300 according to an exemplary aspect of the present invention may for instance represent the server 110 of FIG. 1. Apparatus 300 may for instance represent the first apparatus.

Apparatus 300 comprises a processor 310, working memory 330, program memory 320, optional data memory 340, communication interface(s) 350, an optional user interface 360 and optional sensor(s) 370.

Apparatus 300 may for instance be configured to perform and/or control or comprise respective means (at least one of 310 to 370) for performing and/or controlling the method according to the first exemplary aspect of the present invention. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control the method according to exemplary aspects of the invention.

Processor 310 may for instance comprise a trust level determiner 311 as a functional and/or structural unit. Trust level determiner 311 may for instance be configured to determine a trust level (see step 202 of FIG. 2). Processor 310 may for instance further control the memories 320 to 340, the communication interface(s) 350, the optional user interface 360 and the optional sensor(s) 370.

Processor 310 may for instance execute computer program code stored in program memory 320, which may for instance represent a computer readable storage medium comprising program code that, when executed by processor 310, causes the processor 310 to perform the method according to the first exemplary aspect.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 320 may also be included into processor 310. This memory may for instance be fixedly connected to processor 310, or be at least partially removable from processor 310, for instance in the form of a memory card or stick. Program memory 320 may for instance be non-volatile memory. It may for instance be a FLASH memory (or a part thereof), any of a ROM, PROM, EPROM and EEPROM memory (or a part thereof) or a hard disc (or a part thereof), to name but a few non-limiting examples. Program memory 320 may also comprise an operating system for processor 310. Program memory 320 may also comprise a firmware for apparatus 300.

Apparatus 300 comprises a working memory 330, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Optional data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few non-limiting examples. Data memory 340 may for instance store one or more pieces of first authentication information. One or more pieces of first authentication information may for instance be gathered the optional sensor(s) 370.

Communication interface(s) 350 enable apparatus 300 to communicate with other entities, e.g. with server 110 of FIG. 1. The communication interface(s) 350 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 300 to communicate with other entities, for instance with server 110 of FIG. 1.

User interface 360 is optional and may comprise a display for displaying information to a user and/or an input device (e.g. a keyboard, keypad, touchpad, mouse, etc.) for receiving information from a user.

Sensor(s) 370 are optional and may for instance comprise an input sensor (e.g. for gathering gesture, swiping, typing, touching, and/or holding input information), accelerometer and/or gyroscope sensor (e.g. for gathering holding, turning, and/or carrying information), a camera sensor, a localization sensor (e.g. a GPS sensor for gathering e.g. a horizontal position of the electronic device), or a combination thereof to name but a few non-limiting examples. The gathered information may for instance be used as smart authentication parameters.

Some or all of the components of the apparatus 300 may for instance be connected via a bus. Some or all of the components of the apparatus 300 may for instance be combined into one or more modules.

Figure 4:
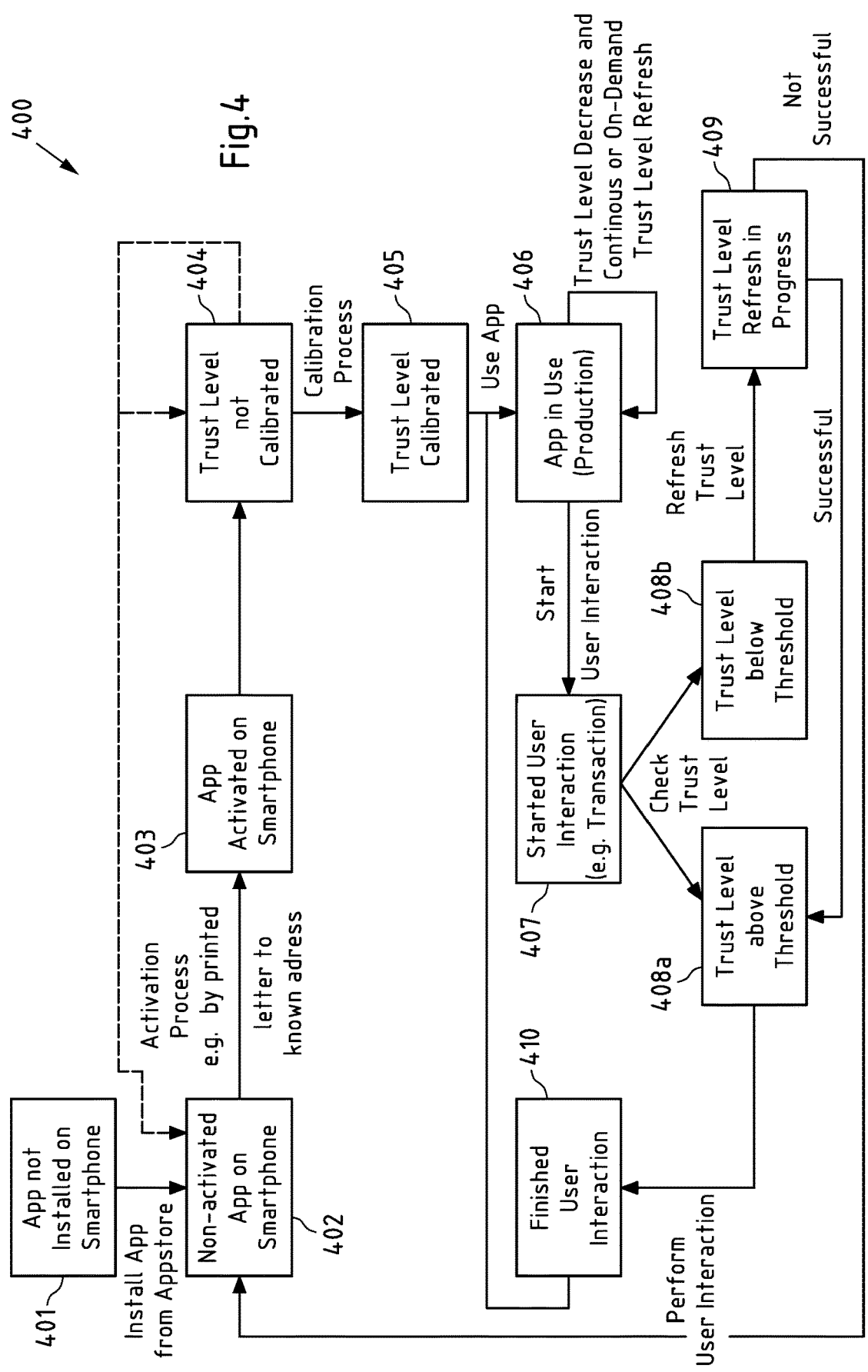
FIG. 4 shows a flowchart showing an example embodiment of a further method according to the first exemplary aspect of the present invention.

FIG. 4 shows a flowchart showing an example embodiment of a further method according to the first exemplary aspect of the present invention.

Step 401 represents an initial state, wherein an application (e.g. application 131 of FIG. 1), e.g. configured to perform and/or control the method according to the first exemplary aspect of the present invention is not installed on an electronic device, e.g. electronic device 130 of FIG. 1.

In step 402, the application not installed on the electronic device (step 401) is now installed on the electronic device. The installed application is not activated, so that e.g. a request for a service requiring authentication of the user is at the state represented by step 402 not possible. Thus, the application needs to be activated. This may for instance be done by sending a printed letter to a known address of the user. The letter may for instance contain a code or the like, which the user may enter into the electronic device as a corresponding request for entering the code prompted by the application (e.g. application 131 of FIG. 1) of the electronic device (e.g. electronic device 130 of FIG. 1). Thus, an activation process of the application may be carried out. Further activation processes of the application may be possible, e.g. a digital activation process, e.g. performed during or at the first run of the application. The contained code may for instance be entered and the application of the electronic device (e.g. electronic device 130 of FIG. 1) may for instance transmit the information to a server (e.g. server 110 of FIG. 1). The activation process may thus be performed between the electronic device (e.g. electronic device 130 of FIG. 1) and the server (e.g. server 110 of FIG. 1).

After the activation process, the application is in an activated state installed on the electronic device (step 403).

In step 404, a trust level is not yet calibrated. Thus, at least one calibration information may for instance be determined (e.g. by server 110 of FIG. 1) based, at least in part on one or more pieces of first authentication information. In case the at least one calibration information may not be determined respectively determinable, step 404 may be repeated until the at least one calibration information is determined, as indicated by the stroked arrow pointing from step 404 to step 404. Further, in case the at least one calibration information cannot be determined, e.g. after a plurality (e.g. three) of not successful attempts to determine the at least one calibration information, it may be proceeded with step 402, as indicated by the stroked arrow pointing from step 404 to 402. Additionally, the at least one calibration information may be determined based on one or more pieces of second authentication information and/or one or more pieces of third authentication information. The at least one calibration information may for instance be used to define a threshold. Further, the threshold may for instance be used as a basis for a predefined authentication threshold for the checking of a determined trust level (steps 408*a* or 408*b*).

Step 405 represents that the trust level is calibrated, e.g. by aforementioned calibration process.

Step 406 represents that the application of the electronic device is in use. Since the trust level may for instance, like in this described embodiment, be a time-dependent function, an initially determined trust level decreases with expiration of time. This represents a timely restricted integrity of for instance one or more pieces of first authentication information, based, at least in part, on which the trust level is determined. A decreased trust level may for instance be refreshed (e.g. by server 110 of FIG. 1), e.g. by adding a certain value to the current value of the trust level. For instance, a trust refreshing parameter may for instance represent a certain value (e.g. between a range of 0 to 100) to be added to the trust level. Further, a trust refreshing parameter may for instance be associated with one or more certain events. For instance, a trust refreshing parameter may for instance be associated with a checking of a behavior of the user. One or more behavior recognition parameters may for instance be obtained, e.g. gathered by one or more sensors (e.g. sensors 132 of FIG. 1) of the electronic device (e.g. electronic device 130 of FIG. 1) and may for instance be provided to a server (e.g. server 110 of FIG. 1). The obtained one or more behavior recognition parameter may for instance be checked (e.g. by server 110 of FIG. 1), e.g. by comparing them to already obtained (e.g. stored in a database (e.g. database 120 of FIG. 1)) one or more behavior recognition parameters. In case a certain similarity or identity is recognized between the obtained one or more behavior parameters and the stored ones, a certain amount of trust level value may for instance be added to the trust level. Alternatively or additionally, a decreased trust level may for instance be refreshed (e.g. by server 110 of FIG. 1), e.g. by determining a new value of the trust level according to pre-defined rules, e.g. by an algorithm. For instance, a trust refreshing parameter may for instance be associated with one or more certain events. For instance, a trust refreshing parameter may for instance be associated with a checking of a behavior of the user. Based on the behavior of the user, a new value of the trust level may for instance be determined according to pre-defined rules, e.g. an algorithm. The new value of the trust level may for instance be increased or decreased based on the result of the checking of the behavior of the user. For instance, the trust level value may be decreased in case the behavior of the user is contrast to typically observed behavior of the user. The trust level value may for instance be increased in case the behavior of the user matches the typically observed behavior of the user. In contrast to the determining of the trust level, which is based, at least in part, on the one or more pieces of first authentication information (e.g. comprising one or more behavior parameters), the behavior check is reduced to checking specific parameters of the smart authentication parameters. In this way, the efficiency (e.g. energy consumption, data volume traffic to name but a few non-limiting examples) may for instance be enhanced. Alternatively or additionally, the aforementioned refreshing of the trust level may for instance be performed (e.g. by server 110 of FIG. 1) by using in particular other smart authentication parameters comprising one or more of the following: (i) one or more behavior recognition parameters; (ii) one or more face recognition parameters; (iii) one or more temporal constraints parameters; (iv) one or more local constraints parameters; (v) or a combination thereof.

The refreshing of the trust level may for instance be performed continuously (e.g. in predefined time intervals, or based on certain events, to name but a few non-limiting examples) and/or on-demand (e.g. based on a request by the user, for instance the request entered into the electronic device by the user).

In step 407, a user has requested a service (e.g. from a server of a service provider) which requires an authentication (e.g. a transaction for transferring money). One or more new pieces of first authentication information may for instance be obtained (e.g. gathered by the electronic device 130 of FIG. 1, or additionally or alternatively obtained e.g. by server 110 of FIG. 1), in case the determined trust level has fallen below the authentication threshold. Further a trust level is determined (e.g. by server 110 of FIG. 1) based, at least in part, on the one or more pieces of first authentication information.

In steps 408*a* and 408*b*, the trust level is checked (e.g. by server 110 of FIG. 1). It is checked whether the trust level is above (step 408*a*) a predefined threshold (e.g. determined by the calibration process as described above) or not. In case the trust level is above the predefined threshold, the requested user interaction (e.g. the transaction) is performed. For instance, an authentication information indicative of the user being successfully authenticated or not, may for instance be generated ((e.g. by server 110 of FIG. 1). The generated authentication information may for instance be provided from e.g. server 110 of FIG. 1 to the electronic device of the user (e.g. electronic device 130 of FIG. 1), which may for instance transmit the authentication information to the server of the service provider. Alternatively, the server that generated the authentication information (e.g. server 110 of FIG. 1) may provide the authentication information to the server of the service provider.

In case the trust level is below (step 408*b*) the predefined threshold, a demand for refreshing the trust level may for instance be performed (e.g. by server 110 of FIG. 1) indicated by step 409. For instance, a behavior check or position check may be performed (as described above). In case the refreshing of the trust level is successful (e.g. adding a certain value to the trust level so that the comparison of the trust level with the predefined threshold results in the trust level is above the predefined threshold), the requested user interaction (e.g. the transaction) is performed. In case e.g. the behavior check or position check for refreshing the trust levels fails (e.g. the obtained one or more behavior recognition parameters do not match or are not similar to pre-stored one or more behavior recognition parameters indicative of individual behavior of the user), the requested user interaction (e.g. the transaction) is not performed. Further, the activated application of the electronic device may for instance be set back to a non-activated state, e.g. for preventing fraudulent usage of the application.

In step 410, the request of the user is finished and the application of the electronic device may for instance be used for further user interactions represented by the arrow pointing to step 406.

Figure 5:
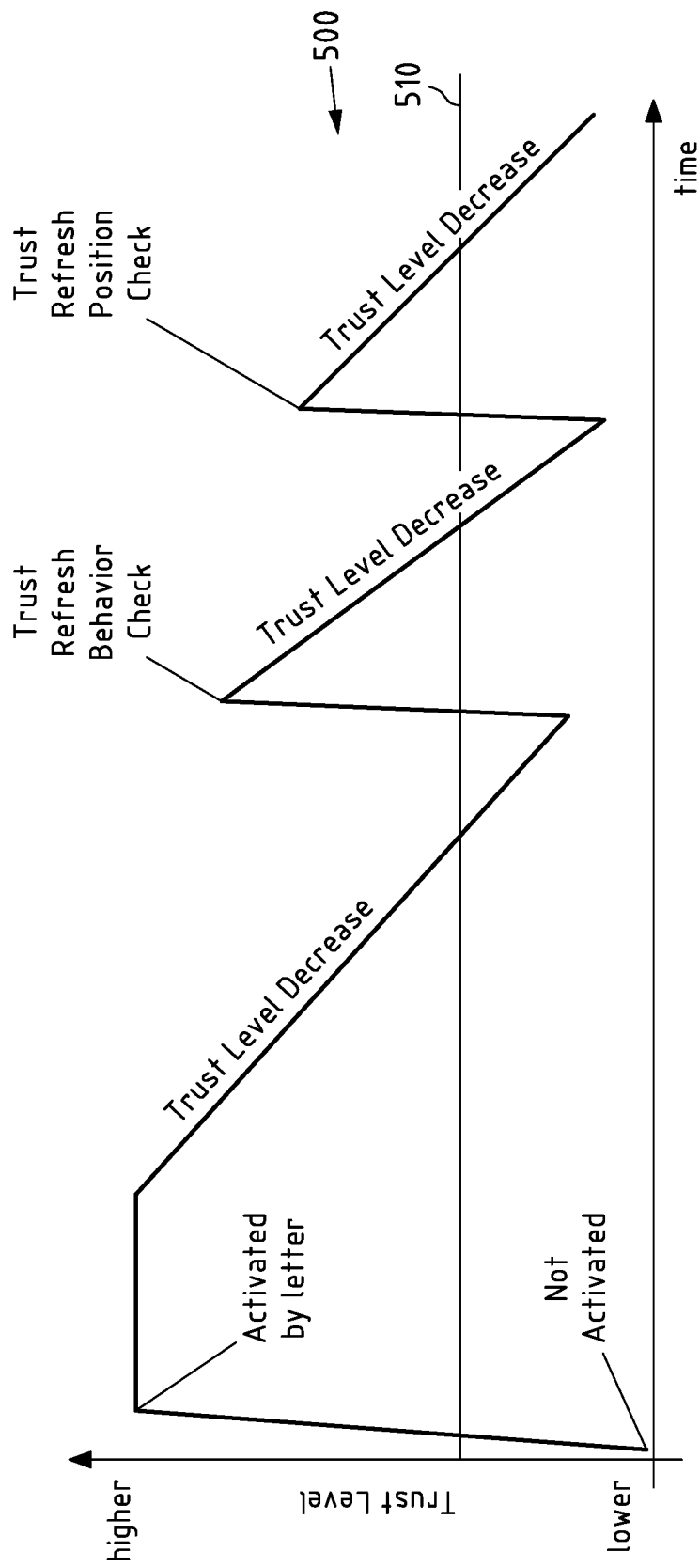
FIG. 5 shows a plotted diagram of a trust level as a time-dependent function as used in an example embodiment of a method according to the first exemplary aspect of the present invention.

FIG. 5 shows a plotted diagram 500 of a trust level as a time dependent function as used in an example embodiment of a method according to the first exemplary aspect of the present invention. The x-axis represents the time, and the y-axis represents the trust level.

The plotted trust level in the diagram 500 varies e.g. between a value range of 0 and 100. Thus, a value of 0 may represent no level of trust associated with the one or more first authentication information at all. A value of 100 may represent the maximum level of trust associated with the one or more first authentication information.

The value of the trust is determined based, at least in part, on one or more pieces of first authentication information. The value of the trust level may for instance be determined during several points of time. Additionally or alternatively, the value of the trust level may for instance be determined continuously, e.g. that the plot of the trust level is steady.

The value indicated with the label 'not activated' represents a non-activated application (e.g. application 131 of FIG. 1) of an electronic device (e.g. electronic device 130 of FIG. 1) (see step 402 of FIG. 4). The trust level value may for instance be 0. After the application of the electronic device is activated (e.g. via an activation process by a printed letter; see step 403 of FIG. 4), an initial trust level is established. In the current case, the trust level value after the activation process may for instance be 100.

Since the trust level is a time-dependent function, the initially determined trust level decreases with expiration of time, indicated by the label 'trust level decrease'. After the activation process, the trust level decreases, in the current case until it is below a predefined threshold 510. A task (e.g. a service requested by a user requiring an authentication) may for instance only be carried out in case the determined trust level is above or equal than the predetermined threshold 510. In case the determined trust level is lower than the predetermined threshold 510, the task may for instance not be carried out.

In case the expiration of time has decreased the level of trust below the predefined threshold 510, refreshing the trust level may be necessary so that a task requested by the user is possible to be carried out. For instance, refreshing of the trust level may be performed by a behavior check, indicated by the label 'trust refresh behavior check', and/or by a position check (e.g. comparing current horizontal location for instance obtained by a GPS sensor of the electronic device with a location or location area stored in a database (e.g. database 120 of FIG. 1)), indicated by the label 'trust refresh position check'.

In this way, the authentication is more secure since a determined trust level may for instance become not integer anymore.

The following embodiments of the present invention shall also be considered to be disclosed:

In embodiments of the invention, the basic technology "Smart Platform Identity" is the basis of all other use cases.

Once user's identities is secured, protected and proven, all other use cases can confide in this secure identity. Various levels for identity protection are offered:
Standard Multi Factor Authentication;
Smart Multi Factor Authentication;
Dynamic Multi Factor Authentication.

Today the identity of a user is protected by different factors to achieve a Standard Multi Factor Authentication:
I have:
   The user has the smartphone. The app is tied to this special smartphone via the app activation. The app activation is done according to the standard AST activation. Both smartphone and app are protected against threats.
I know:
   The user has a pin to unlock the smartphone (standard locking mechanism) and he has a pin to use the app alter the app has been activated. The app is checked against the SSMS server via the secure communication channel.
I am:
   Fingerprints of the user can be used to identify the user of the smartphone. The fingerprint may for instance be obtained by a biometric sensor of the smartphone. This is a standard locking mechanism of state-of-the-art smartphones.

In embodiments of the present invention, standard multi factor authentication (as well as all additional authentication levels) is provided on one device.

Since identity protection is getting more and more important in the future, additional protection mechanisms are needed. There will be new mechanisms to enhance basic multi factor authentication even more. Thus, in embodiments of the present invention, Standard Multi Factor Authentication is elevated to Smart Multi Factor Authentication which provides additional features to secure the identity of a user.

Smart Multi Factor Authentication is a static way to improve identity security. The "smart" mechanisms are:
Behaviour Recognition:
   Each user has its own way of handling his smartphone. Gestures, swiping, typing, touching, holding, turning and carrying the smartphone form a unique "behavioral" fingerprint. The components of this behavioral fingerprint are automatically collected by use of the smartphone's internal sensors like gyroscopic sensors, touchscreen sensors or by other motion detection sensors. All sensor results are combined to form a unique digital fingerprint representing the behavioral fingerprint. This behavioral fingerprint is stored on a server (e.g. an authentication server), constantly updated and calibrated. In production, the current (e.g. obtained) behavioral fingerprint is verified against the stored fingerprint.
Acoustical/Sound/Voice Recognition:
   The smartphone uses the internal smartphone microphone to record a sound or a voice of the user. This sound or voice is analyzed to "recognize" the user. Only if the user is properly recognized, access to the app is granted and the functionality will be available. This feature is protected against fake sounds or voices. Protection against fake sounds or voices can be achieved e.g. by a robot-based fake detection processes.
Optical/Face Recognition:
   The smartphone uses the internal smartphone camera to shoot a photo or a video of the user. This photo or video is analyzed to "recognize" the user. Only if the user is properly recognized, access to the app is granted and the functionality will be available. This feature is protected against fake faces on photos or videos. Protection against fake faces can be achieved e.g. by a robot-based fake detection processes. A face detection robot gives random instructions, e.g. tells the user to close the left or right eye or to turn the head left or right. If the instructions are carried out properly, the face is genuine and not a video or a picture of a face. In addition to this logical bot-based face recognition there is also a security instance which is able to secure taking photos or videos. This feature is called "Secure Photo".
Temporal Constraints:
   Based on date and time a server (e.g. the authentication server) decides whether an identity of a user is valid or not. The rules of these constraints are defined on the server.

EXAMPLES

Transactions are only valid during work hours from 9-5;
Transactions are only valid if the user is not on holiday;
Transactions are only valid with a defined start and end date.
Local Constraints:
   The app uses the smartphone's position detection features like gps, wlan, timezone, provider, etc. to detect the current location of the smartphone. To protect the ascertained location against manipulation by hackers, all available position detection features (and the respective location history) are combined and an algorithm calculates the risk of a manipulation. According to this risk, the app and a server (e.g. the authentication server) can decide whether a location of the smartphone is valid or not. This is called "Secure Location".

Examples

Transactions are only valid within/outside a particular country;
Transactions are only valid at the user's home address.

In embodiments of the invention, all mechanisms may have to be calibrated before they can be used to identify the user. After having installed the app on the device (e.g. the smartphone), the user has to activate the app. The activation of the app (for example by activation letter via registered mall) leads to an initial trust level. After logging in to the app, the Smart Multi Factor Authentication mechanisms have to be calibrated. The calibration data is stored on a server (e.g. the authentication server). Each time a Smart Multi Factor Authentication mechanism is requested, the app has to provide the respective data (gestures/typing, photo, location information, time zones). The server verifies the current data with the calibrated data and calculates the match: This value is a value between 0 and 100 and is called trust level.
Definition of Trust Level:
   The trust level is an abstract value from 0 to 100 which indicates the level of trust. A trust level of 100 indicates perfect identification of a user and thus full trust. A level of 0 indicates no trust at all. According to the level of trust, app and server can decide whether tasks are carried out or not or which amount of money is available for transactions. Trust levels can be adapted (also dynamically) according to the use cases and expected risks.

Example for Financial Scenario:
Trust Level 0-30: No transactions allowed;
Trust Level 31-60: Only non-financial transactions allowed (e.g. get bank account statements);
Trust Level 61-90: Non-financial transactions and financial transactions up to 1000€ allowed;
Trust Level 91-100: Unlimited transactions allowed.

Example "Face Recognition":
A face recognition is not either "true" or "false". The result of a face recognition is a value between 0 and 100. The value 0 indicates that the face is definitely not recognized, the value 100 declares that the face is recognized without any doubt. The same metrics apply to all other features. The features implying a certain amount of calibration and learning (like face and behavior recognition) will only be available after the learning curve is done.

Of course all Smart Multi Factor Authentication features can be combined. For example transactions are only valid if they are triggered within a particular geographical location and within a given period and the behavioral data should have been updated within a certain time.

The pieces of data for Smart Multi Factor Authentication are acquired either by a special acquisition app or by an end user app.

Dynamic Multi Factor Authentication is a dynamic approach to improve identity security even further. This is done by the following mechanisms:

Dynamic Trust Refresh:
In a dynamic scenario, the trust level is a function of time. That means trust levels decrease as time goes on. The longer a mechanism is not verified the less value it has to identify the user. A trust refresh increases the trust level again, according to the security level of the respective refresh.

Refreshing the trust level can for instance be done in two ways:
Constantly scanning the user, e.g. behavior of the user, the current location, the device time, or a combination thereof; and/or
On demand, that means the trust level fell below a defined minimum trust level threshold and a trust refresh is requested by the app.

Dynamic Trust References:
The trust level of each user can be defined by internal trust mechanisms (see above) or by external trust authorities. The external trust authorities provide a trust level for each identity which can be used also internally. Referencing external trust authorities can be done dynamically, either periodically or on demand.

Example Trust References are:
Letter activations (Users answer physical activation letters sent via standard mail, answers are stored in an internal CRM (Customer-Relationship-Management) system);
3rd party identity providers (e.g. via SAML). Only non-critical information is passed to the 3rd party providers;
Any other data source in the back end.

Further, also the following embodiments of the invention shall be considered to be disclosed:

Embodiment 1

A method, performed and/or controlled by at least one apparatus, the method comprising:

obtaining one or more pieces of first authentication information, wherein the one or more pieces of first authentication information represent at least one piece of unique information associated with a user and/or an electronic device of the user; and
determining a trust level based, at least in part, on the one or more pieces of first authentication information, wherein the trust level value is indicative of a level of trust in the one or more pieces of first authentication information.

Embodiment 2

The method according to embodiment 1, wherein the trust level can adopt more than two values.

Embodiment 3

The method according to embodiment 1 or embodiment 2, the method further comprising:
checking the trust level, wherein the trust level is checked based, at least in part, on a comparison of the trust level with a predefined checking threshold.

Embodiment 4

The method according to any of the preceding embodiments, wherein the trust level is a time-dependent function, wherein the trust level decreases with elapsing of time.

Embodiment 5

The method according to embodiment 4, wherein the time dependent function defines the decreasing of the trust level.

Embodiment 6

The method according to any of the preceding embodiments, wherein the steps of obtaining one or more pieces of first authentication information and of determining a trust level are repeated to obtain an updated trust level in case the trust level has fallen below a predefined authentication threshold.

Embodiment 7

The method according to any of the preceding embodiments, wherein the one or more pieces of first authentication information comprise one or more of the following types i) to v) of parameters:
i) one or more behavior recognition parameters;
ii) one or more acoustical recognition parameters;
iii) one or more optical recognition parameters, in particular one or more face recognition parameters;
iv) one or more temporal constraints parameters;
v) one or more local constraints parameters.

Embodiment 8

The method according to embodiment 7, wherein the trust level is determined based, at least in part, on at least two different types of the types i) to iv) of parameters comprised by the one or more pieces of first authentication information.

Embodiment 9

The method according to embodiment 7 or embodiment 8, wherein the one or more behavior recognition parameters are obtained over a period of time, which is predefined or determined according to a predefined rule.

Embodiment 10

The method according to any of embodiments 7 to 9, wherein the one or more behavior recognition parameters are obtained more than once.

Embodiment 11

The method of any of embodiments 7 to 10, wherein the one or more behavior parameters are obtained based, at least in part, on a combination with one or more behavior recognition parameters obtained at a previous time.

Embodiment 12

The method according to any of the preceding embodiments, further comprising:
  obtaining one or more pieces of second authentication information, wherein the one or more pieces of second authentication information comprise one or more of the following types a) and b) of parameters:
  a) one or more trust refreshing parameters, wherein the one or more trust refreshing parameters are indicative of a trust level value, wherein the one or more trust refreshing parameters are determined based, at least in part, on the one or more pieces of first authentication information;
  b) one or more trust reference parameters, wherein the one or more trust reference parameters are indicative of a trust level value associated with an external trust authority;
    wherein the trust level is determined further based, at least in part, on the one or more pieces of second authentication information.

Embodiment 13

The method according to any of the preceding embodiments, further comprising:
  determining at least one calibration information based, at least in part, on the one or more pieces of first authentication information and/or based, at least in part, on the one or more pieces of second authentication information, wherein the at least one calibration information is used to define a threshold.

Embodiment 14

The method according to embodiment 13, wherein the authentication threshold and/or the checking threshold is set based, at least in part, on the at least one calibration information.

Embodiment 15

The method according to any of the preceding embodiments, further comprising:
  determining one or more pieces of calibration information based, at least in part, on one or more first authentication information obtained previously, wherein the one or more pieces of calibration information are indicative of at least one calculated trust level of one or more of the types of parameters comprised by the one or more pieces first authentication information.

Embodiment 16

The method according to any of the preceding embodiments, wherein the one or more pieces of first authentication information and/or the one or more pieces of second authentication information are stored in a database.

Embodiment 17

The method according to embodiment 16, wherein the one or more pieces of first authentication information and/or the one or more pieces of second authentication information stored in the database are adaptable.

Embodiment 18

The method according to embodiment 16 or embodiment 17, wherein the at least one calibration information is determined based, at least in part, on the one or more pieces of first authentication information and/or the one or more pieces of second authentication information stored in the database.

Embodiment 19

The method according to any of the preceding embodiments, further comprising:
  obtaining one or more pieces of third authentication information, wherein the one or more pieces of third authentication information are indicative, at least in part, of one or more of the following:
  (i) one or more ownership parameters;
  (ii) one or more knowledge parameters;
  (iii) one or more biometric parameters.

Embodiment 20

The method according to any of the preceding embodiments, wherein the trust level is determined, at least in part, on the one or more pieces of third authentication information.

Embodiment 21

The method according to any of the preceding embodiments, further comprising:
  providing (i) the one or more pieces of first authentication information, (ii) the one or more pieces of second authentication information, (iii) the one or more pieces of second authentication information, (iv) or a combination thereof for usage in an authentication process.

Embodiment 22

The method according to any of the embodiments 3 to 21, further comprising:
  providing an authentication information, wherein the authentication information is determined based, at least in part, on a result of the checking of the trust level.

Embodiment 23

An apparatus comprising at least one processor and at least one memory including computer program code, the at least one memory and the computer program code configured to, with the at least one processor, cause the apparatus to at least perform:
- obtaining one or more pieces of first authentication information, wherein the one or more pieces of first authentication information represent at least one piece of unique information associated with a user and/or an electronic device of the user; and
- determining a trust level based, at least in part, on the one or more pieces of first authentication information, wherein the trust level value is indicative of a level of trust in the one or more pieces of first authentication information.

Embodiment 24

The apparatus according to embodiment 19, wherein the trust level can adopt more than two values.

Embodiment 25

The apparatus according to embodiment 1 or embodiment 2, the at least one memory and the computer program code configured to, with the at least one processor, cause the apparatus further to perform:
- checking the trust level, wherein the trust level is checked based, at least in part, on a comparison of the trust level with a predefined checking threshold.

Embodiment 26

The apparatus according to any of the preceding embodiments, wherein the trust level is a time dependent function, wherein the trust level decreases with elapsing of time.

Embodiment 27

The apparatus according to embodiment 26, wherein the time dependent function defines the decreasing of the trust level.

Embodiment 28

The apparatus according to any of the preceding embodiments, wherein the steps of obtaining one or more pieces of first authentication information and of determining a trust level are repeated to obtain an updated trust level in case the trust level has fallen below a predefined authentication threshold.

Embodiment 29

The apparatus according to any of the preceding embodiments, wherein the one or more pieces of first authentication information comprise one or more of the following types i) to v) of parameters:
  i) one or more behavior recognition parameters;
  ii) one or more acoustical recognition parameters;
  iii) one or more optical recognition parameters, in particular one or more face recognition parameters;
  iv) one or more temporal constraints parameters;
  v) one or more local constraints parameters.

Embodiment 30

The apparatus according to embodiment 29, wherein the trust level is determined based, at least in part, on at least two different types of the types i) to iv) of parameters comprised by the one or more pieces of first authentication information.

Embodiment 31

The apparatus according to embodiment 29 or embodiment 30, wherein the one or more behavior recognition parameters are obtained over a period of time, which is predefined or determined according to a predefined rule.

Embodiment 32

The apparatus according to any of embodiments 29 to 31, wherein the one or more behavior recognition parameters are obtained more than once.

Embodiment 33

The apparatus of any of embodiments 29 to 32, wherein the one or more behavior parameters are obtained based, at least in part, on a combination with one or more behavior recognition parameters obtained at a previous time.

Embodiment 34

The apparatus according to any of the preceding embodiments, the at least one memory and the computer program code configured to, with the at least one processor, cause the apparatus further to perform:
- obtaining one or more pieces of second authentication information, wherein the one or more pieces of second authentication information comprise one or more of the following types a) and b) of parameters:
  a) one or more trust refreshing parameters, wherein the one or more trust refreshing parameters are indicative of a trust level value, wherein the one or more trust refreshing parameters are determined based, at least in part, on the one or more pieces of first authentication information;
  b) one or more trust reference parameters, wherein the one or more trust reference parameters are indicative of a trust level value associated with an external trust authority;
  wherein the trust level is determined further based, at least in part, on the one or more pieces of second authentication information.

Embodiment 35

The apparatus according to any of the preceding embodiments, the at least one memory and the computer program code configured to, with the at least one processor, cause the apparatus further to perform:
- determining at least one calibration information based, at least in part, on the one or more pieces of first authentication information and/or based, at least in part, on the one or more pieces of second authentication information, wherein the at least one calibration information is used to define a threshold.

Embodiment 36

The apparatus according to embodiment 35, wherein the authentication threshold and/or the checking threshold is set based, at least in part, on the at least one calibration information.

Embodiment 37

The apparatus according to any of the preceding embodiments, the at least one memory and the computer program code configured to, with the at least one processor, cause the apparatus further to perform:
  determining one or more pieces of calibration information based, at least in part, on one or more first authentication information obtained previously, wherein the one or more pieces of calibration information are indicative of at least one calculated trust level of one or more of the types of parameters comprised by the one or more pieces first authentication information.

Embodiment 38

The apparatus according to any of the preceding embodiments, wherein the one or more pieces of first authentication information and/or the one or more pieces of second authentication information are stored in a database.

Embodiment 39

The apparatus according to embodiment 38, wherein the one or more pieces of first authentication information and/or the one or more pieces of second authentication information stored in the database are adaptable.

Embodiment 40

The apparatus according to embodiment 38 or embodiment 39, wherein the at least one calibration information is determined based, at least in part, on the one or more pieces of first authentication information and/or the one or more pieces of second authentication information stored in the database.

Embodiment 41

The apparatus according to any of the preceding embodiments, the at least one memory and the computer program code configured to, with the at least one processor, cause the apparatus further to perform:
  obtaining one or more pieces of third authentication information, wherein the one or more pieces of third authentication information are indicative, at least in part, of one or more of the following:
  (i) one or more ownership parameters;
  (ii) one or more knowledge parameters;
  (iii) one or more biometric parameters.

Embodiment 42

The apparatus according to any of the preceding embodiments, wherein the trust level is determined, at least in part, on the one or more pieces of third authentication information.

Embodiment 43

The apparatus according to any of the preceding embodiments, the at least one memory and the computer program code configured to, with the at least one processor, cause the apparatus further to perform:
  providing (i) the one or more pieces of first authentication information, (ii) the one or more pieces of second authentication information, (iii) the one or more pieces of second authentication information, (iv) or a combination thereof for usage in an authentication process.

Embodiment 44

The apparatus according to any of the embodiments 23 to 43, the at least one memory and the computer program code configured to, with the at least one processor, cause the apparatus further to perform:
  providing an authentication information, wherein the authentication information is determined based, at least in part, on a result of the checking of the trust level.

Embodiment 45

A tangible computer-readable medium storing computer program code, the computer program code when executed by a processor causing an apparatus to perform and/or control:
  obtaining one or more pieces of first authentication information, wherein the one or more pieces of first authentication information represent at least one piece of unique information associated with a user and/or an electronic device of the user; and
  determining a trust level based, at least in part, on the one or more pieces of first authentication information, wherein the trust level value is indicative of a level of trust in the one or more pieces of first authentication information.

Embodiment 46

System, comprising one or more apparatuses, in particular according to any of the embodiments 23 to 44 (e.g. at least one electronic device and at least one server), which are configured to perform and/or control the method of any of the embodiments 1 to 22.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus comprising at least one processor and at least one memory including computer program code, the at least one memory and the computer program code configured to, with the at least one processor, cause the apparatus to at least perform:
   obtaining one or more pieces of first authentication information, wherein the one or more pieces of first authentication information represent at least one piece of unique information associated with at least one of a user and an electronic device of the user wherein the one or more pieces of first authentication information comprise one or more behavior recognition parameters, wherein the one or more behavior recognition parameters are gathered by one or more sensors of the electronic device of the user;
   obtaining one or more pieces of second authentication information, wherein the one or more pieces of second authentication information comprise at least one of:
   a) one or more trust refreshing parameters, wherein the one or more trust refreshing parameters are indicative of a trust level value, wherein the one or more trust refreshing parameters are determined based, at least in part, on the one or more pieces of first authentication information,
   wherein the trust refreshing parameter is associated with a checking of a behavior of a user; or
   b) one or more trust reference parameters, wherein the one or more trust reference parameters are indicative of a trust level value associated with an external trust authority; and
   determining a trust level based, at least in part, on the one or more pieces of first authentication information, wherein the trust level value is indicative of a level of trust in the one or more pieces of first authentication information,
   wherein the trust level is determined further based, at least in part, on the one or more pieces of second authentication information.

2. The apparatus according to claim 1, wherein the trust level adopts more than two values.

3. The apparatus according to claim 1, wherein the at least one memory and the computer program code are configured to, with the at least one processor, cause the apparatus to check the trust level, wherein the trust level is checked based, at least in part, on a comparison of the trust level with a predefined checking threshold.

4. The apparatus according to claim 1, wherein the trust level is varied based at least partially on a time dependent function, wherein the trust level decreases with elapsing of time.

5. The apparatus according to claim 4, wherein the time dependent function defines the decreasing of the trust level.

6. The apparatus according to claim 4, wherein the obtaining one or more pieces of first authentication information and the determining a trust level are repeated to obtain an updated trust level in case the trust level has fallen below a predefined authentication threshold.

7. The apparatus according to claim 1, wherein the one or more behavior recognition parameters are a type i) of parameters and wherein the one or more pieces of first authentication information further comprise one or more of the following types ii) to v) of parameters:
  ii) one or more acoustical recognition parameters;
  iii) one or more optical recognition parameters;
  iv) one or more temporal constraints parameters;
  v) one or more local constraints parameters.

8. The apparatus according to claim 7, wherein the trust level is determined based, at least in part, on at least two different types of the types i) to iv) of parameters comprised by the one or more pieces of first authentication information.

9. The apparatus according to claim 7, wherein the one or more behavior recognition parameters are obtained over a period of time, which is predefined or determined according to a predefined rule.

10. The apparatus according to claim 7, wherein the one or more behavior recognition parameters are obtained more than once.

11. The apparatus according to claim 7, wherein the one or more behavior parameters are obtained based, at least in part, on a combination with one or more behavior recognition parameters obtained at a previous time.

12. The apparatus according to claim 1, further comprising:
  obtaining one or more pieces of third authentication information, wherein the one or more pieces of third authentication information are indicative, at least in part, of one or more of the following:
  (i) one or more ownership parameters;
  (ii) one or more knowledge parameters;
  (iii) one or more biometric parameters;
  wherein the trust level is determined, at least in part, on the one or more pieces of third authentication information.

13. The apparatus according to claim 1, further comprising:
  determining at least one calibration information based, at least in part, on at least one of the one or more pieces of first authentication information and the one or more pieces of second authentication information, wherein the at least one calibration information is used to define a threshold.

14. The apparatus according to claim 13, wherein the at least one of authentication threshold and the checking threshold is set based, at least in part, on the at least one calibration information.

15. A method, comprising:
  obtaining one or more pieces of first authentication information, wherein the one or more pieces of first authentication information represent at least one piece of unique information associated with at least one of a user and an electronic device of the user, wherein the one or more pieces of first authentication information comprise one or more behavior recognition parameters as a type i) of parameters, wherein the one or more behavior recognition parameters are gathered by one or more sensors of the electronic device of the user;
  obtaining one or more pieces of second authentication information, wherein the one or more pieces of second authentication information comprise at least one of:
  a) one or more trust refreshing parameters, wherein the one or more trust refreshing parameters are indicative of a trust level value, wherein the one or more trust refreshing parameters are determined based, at least in part, on the one or more pieces of first authentication information,
    wherein the trust refreshing parameter is associated with a checking of a behavior of a user; or
  b) one or more trust reference parameters, wherein the one or more trust reference parameters are indicative of a trust level value associated with an external trust authority; and
  determining a trust level based, at least in part, on the one or more pieces of first authentication information, wherein the trust level value is indicative of a level of trust in the one or more pieces of first authentication information,
  wherein the trust level is determined further based, at least in part, on the one or more pieces of second authentication information.

16. The method according to claim 15, wherein the trust level adopts more than two values.

17. The method according to claim 15, further comprising:
  checking the trust level, wherein the trust level is checked based, at least in part, on a comparison of the trust level with a predefined checking threshold.

18. The method according to claim 15, wherein the trust level is varied based at least partially on a time dependent function, wherein the trust level decreases with elapsing of time.

19. A tangible computer-readable medium storing computer program code, the computer program code when executed by a processor causing an apparatus to at least one of perform and control:
  obtaining one or more pieces of first authentication information, wherein the one or more pieces of first authentication information represent at least one piece of unique information associated with at least one of a user and an electronic device of the user, wherein the one or more pieces of first authentication information comprise one or more behavior recognition parameters, wherein the one or more behavior recognition parameters are gathered by one or more sensors of the electronic device of the user;
  obtaining one or more pieces of second authentication information, wherein the one or more pieces of second authentication information comprise at least one of:
  a) one or more trust refreshing parameters, wherein the one or more trust refreshing parameters are indicative of a trust level value, wherein the one or more trust refreshing parameters are determined based, at least in part, on the one or more pieces of first authentication information,
    wherein the trust refreshing parameter is associated with a checking of a behavior of a user; or
  b) one or more trust reference parameters, wherein the one or more trust reference parameters are indicative of a trust level value associated with an external trust authority; and
  determining a trust level based, at least in part, on the one or more pieces of first authentication information, wherein the trust level value is indicative of a level of trust in the one or more pieces of first authentication information,
  wherein the trust level is determined further based, at least in part, on the one or more pieces of second authentication information.

20. A system comprising two or more apparatuses, each apparatus comprising at least one processor and at least one memory including computer program code, the at least one memory and the computer program code configured to, with the at least one processor, cause the apparatus to at least perform:

obtaining one or more pieces of first authentication information, wherein the one or more pieces of first authentication information represent at least one piece of unique information associated with at least one of a user and an electronic device of the user wherein the one or more pieces of first authentication information comprise one or more behavior recognition parameters, wherein the one or more behavior recognition parameters are gathered by one or more sensors of the electronic device of the user;

obtaining one or more pieces of second authentication information, wherein the one or more pieces of second authentication information comprise at least one of:

a) one or more trust refreshing parameters, wherein the one or more trust refreshing parameters are indicative of a trust level value, wherein the one or more trust refreshing parameters are determined based, at least in part, on the one or more pieces of first authentication information, wherein the trust refreshing parameter is associated with a checking of a behavior of a user; or b) one or more trust reference parameters, wherein the one or more trust reference parameters are indicative of a trust level value associated with an external trust authority; and determining a trust level based, at least in part, on the one or more pieces of first authentication information, wherein the trust level value is indicative of a level of trust in the one or more pieces of first authentication information, wherein the trust level is determined further based, at least in part, on the one or more pieces of second authentication information.

* * * * *